(12) United States Patent
Sung et al.

(10) Patent No.: US 11,093,576 B2
(45) Date of Patent: Aug. 17, 2021

(54) CORE-PLUG TO GIGA-CELLS LITHOLOGICAL MODELING

(75) Inventors: Roger R. Sung, Dhahran (SA); Ahmed S. Al-Ramadan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1255 days.

(21) Appl. No.: 13/616,493

(22) Filed: Sep. 14, 2012

(65) Prior Publication Data

US 2013/0080133 A1    Mar. 28, 2013

Related U.S. Application Data

(60) Provisional application No. 61/534,988, filed on Sep. 15, 2011.

(51) Int. Cl.
*G06F 17/00* (2019.01)
*G01V 99/00* (2009.01)

(52) U.S. Cl.
CPC ............ *G06F 17/00* (2013.01); *G01V 99/005* (2013.01)

(58) Field of Classification Search
None
See application file for complete search history.

(56) References Cited

U.S. PATENT DOCUMENTS

| | | | | | |
|---|---|---|---|---|---|
| 5,828,981 | A | * | 10/1998 | Callender | G01V 11/00 702/6 |
| 5,838,634 | A | * | 11/1998 | Jones | G01V 1/282 367/73 |
| 6,374,185 | B1 | * | 4/2002 | Taner | G01V 1/282 367/73 |
| 7,054,753 | B1 | * | 5/2006 | Williams | G01V 11/00 702/13 |

(Continued)

FOREIGN PATENT DOCUMENTS

WO      2009018525 A2    2/2009

OTHER PUBLICATIONS

Jones et al., "Digital field data acquisition: towards increased quantification of uncertainty during geological mapping", from https://pdfs.semanticscholar.org/b1cc/1c89e7c87d839e84615ac7ac365eaad64bc0.pdf, Jun. 2003, 16 pages.*

(Continued)

*Primary Examiner* — Omar F Fernandez Rivas
*Assistant Examiner* — Robert S Brock
(74) *Attorney, Agent, or Firm* — Bracewell LLP; Constance G. Rhebergen; Christopher L. Drymalla

(57) ABSTRACT

Well core data descriptions are received as input digital data for computer lithofacies modeling. Digital templates are established for carbonate and clastic core description based on reservoir rock formation analysis. Description criteria of the template for carbonate rock can include texture, mineral composition, grain size, and pore type. For clastic rock, the (Continued)

criteria in the template can include grain size, sedimentary structure, lithology, and visual porosity. The data and observations regarding these criteria are entered into a computer 3D geological modeling system directly. Wireline log data are integrated to calibrate with well core description to derive lithofacies. The lithofacies are exported in digital format to be entered into the 3D geological modeling system. A geologically realistic model of the reservoir can be established.

13 Claims, 25 Drawing Sheets

(56) References Cited

U.S. PATENT DOCUMENTS

| | | | | |
|---|---|---|---|---|
| 8,101,907 | B2* | 1/2012 | Jacobi | G01V 5/12 250/256 |
| 8,510,242 | B2* | 8/2013 | Al-Fattah | E21B 49/00 706/21 |
| 8,731,891 | B2 | 5/2014 | Sung et al. | |
| 2006/0041409 | A1* | 2/2006 | Strebelle | G01V 1/30 703/10 |
| 2006/0074825 | A1* | 4/2006 | Mirowski | G01V 1/30 706/20 |
| 2008/0319675 | A1* | 12/2008 | Sayers | G01V 1/50 702/11 |
| 2009/0271116 | A1* | 10/2009 | Norris et al. | 702/11 |
| 2011/0231206 | A1* | 9/2011 | Claud | 705/3 |
| 2012/0221306 | A1* | 8/2012 | Hurley | G01V 99/005 703/6 |
| 2012/0239361 | A1* | 9/2012 | Vargas-Guzman | 703/6 |
| 2013/0179080 | A1* | 7/2013 | Skalinski | G01V 99/00 702/7 |
| 2013/0297272 | A1* | 11/2013 | Sung | G01V 1/306 703/10 |
| 2014/0149041 | A1* | 5/2014 | Sung | G01V 11/00 702/11 |
| 2015/0241591 | A1* | 8/2015 | Burmester | G01V 3/20 702/7 |
| 2018/0225868 | A1* | 8/2018 | Bize | G06T 17/05 |

OTHER PUBLICATIONS

Kraipeerapun, "Neural Network Classification Based on Quantification of Uncertainty", Thesis, Doctor of Philosophy, Murdoch University, Mar. 2009, 224 pages.*

Tang, Hong, William S. Meddaugh, and Niall Toomey. "Using an artificial-neural-network method to predict carbonate well log facies successfully." SPE Reservoir Evaluation & Engineering 14, No. 01 (2011): 35-44 (Year: 2011).*

Authors Unknown, "facies", Schlumberger Oilfied Glossary, obtained from https://www.glossary.oilfield.slb.com/Terms/f/facies.aspx on Jul. 21, 2020, 1page (Year: 2020).*

Authors Unknown, "lithofacies", Schlumberger Oilfied Glossary, obtained from https://www.glossary.oilfield.slb.com/Terms/l/lithofacies.aspx on Jul. 21, 2020, 1page (Year: 2020).*

Authors Unknown, "Facies", PetroWiki, Society of Petroleum Engineers, obtained from https://petrowiki.org/Glossary:Facies on Jul. 21, 2020, 1 page (Year: 2020).*

Authors Unknown, "Lithfacies map", PetroWiki, Society of Petroleum Engineers, obtained from https://petrowiki.org/Glossary:Lithofacies_map on Jul. 21, 2020, 1page (Year: 2020).*

International Search Report and Written Opinion issued in related International Patent Application No. PCT/US2012/055270; dated Aug. 16, 2013; 12 pages.

Kirt Campion, "Strategies for Well Log Correlation within a Sequence Stratigraphic Framework: Is the Gain Worth the Pain?", Recovery—2011 CSPG CSEG CWLS Convention, May 9, 2011, pp. 1-5, XP055074630.

Wikipedia, Well Logging, Jul. 19, 2012, pp. 1-8https://en.wikipedia.org/index.php?title=Special: Cite&page=Well_logging&id=499213395.

* cited by examiner

FIG. 1

| FIG. 1A | FIG. 1B |

FIG. 5

| FIG. 5A | FIG. 5B |
| FIG. 5C | FIG. 5D |
| FIG. 5E | FIG. 5F |
| FIG. 5G | FIG. 5H |
| FIG. 5I | FIG. 5J |

FIG. 6

| FIG. 6A | FIG. 6B |

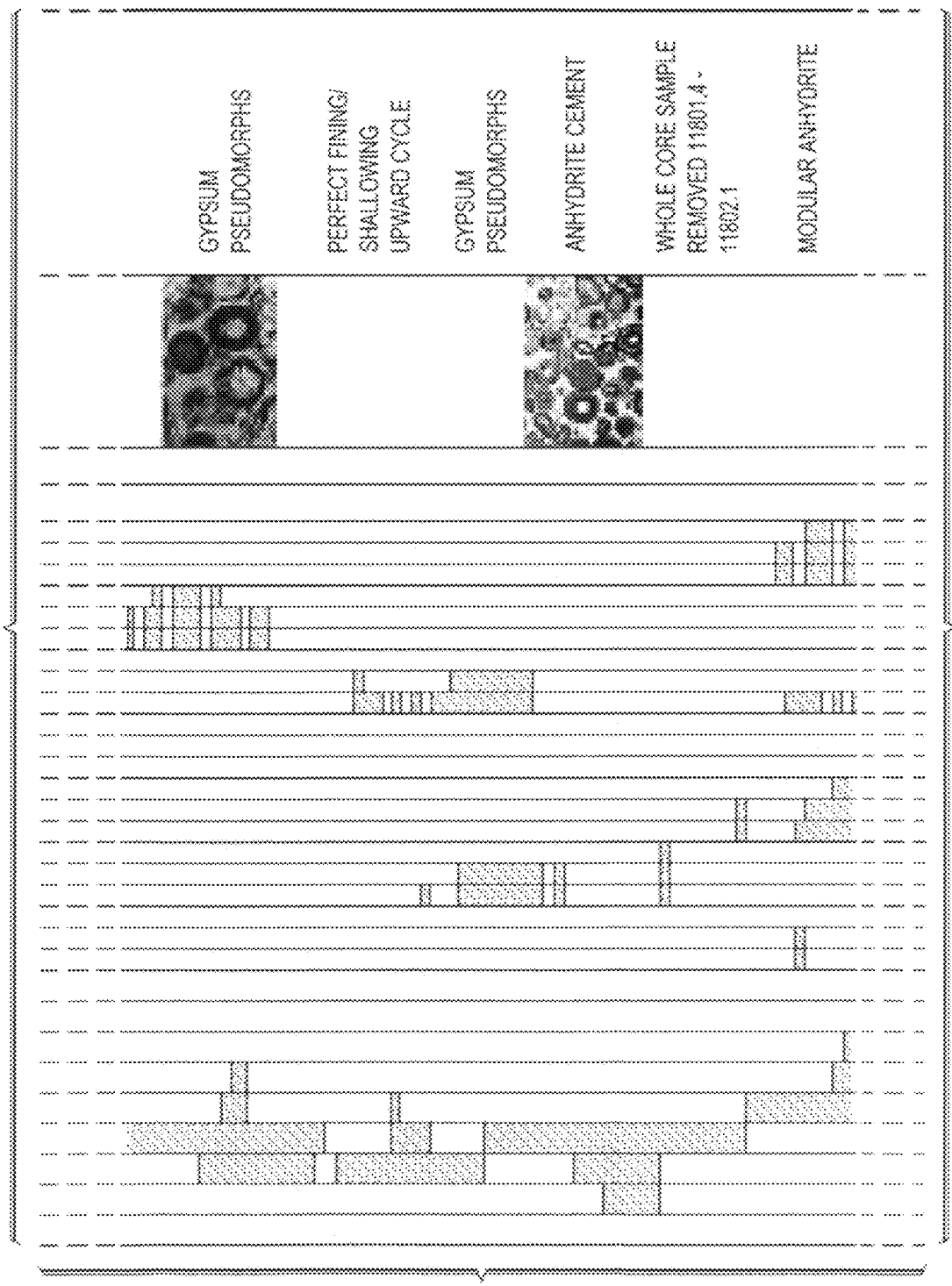

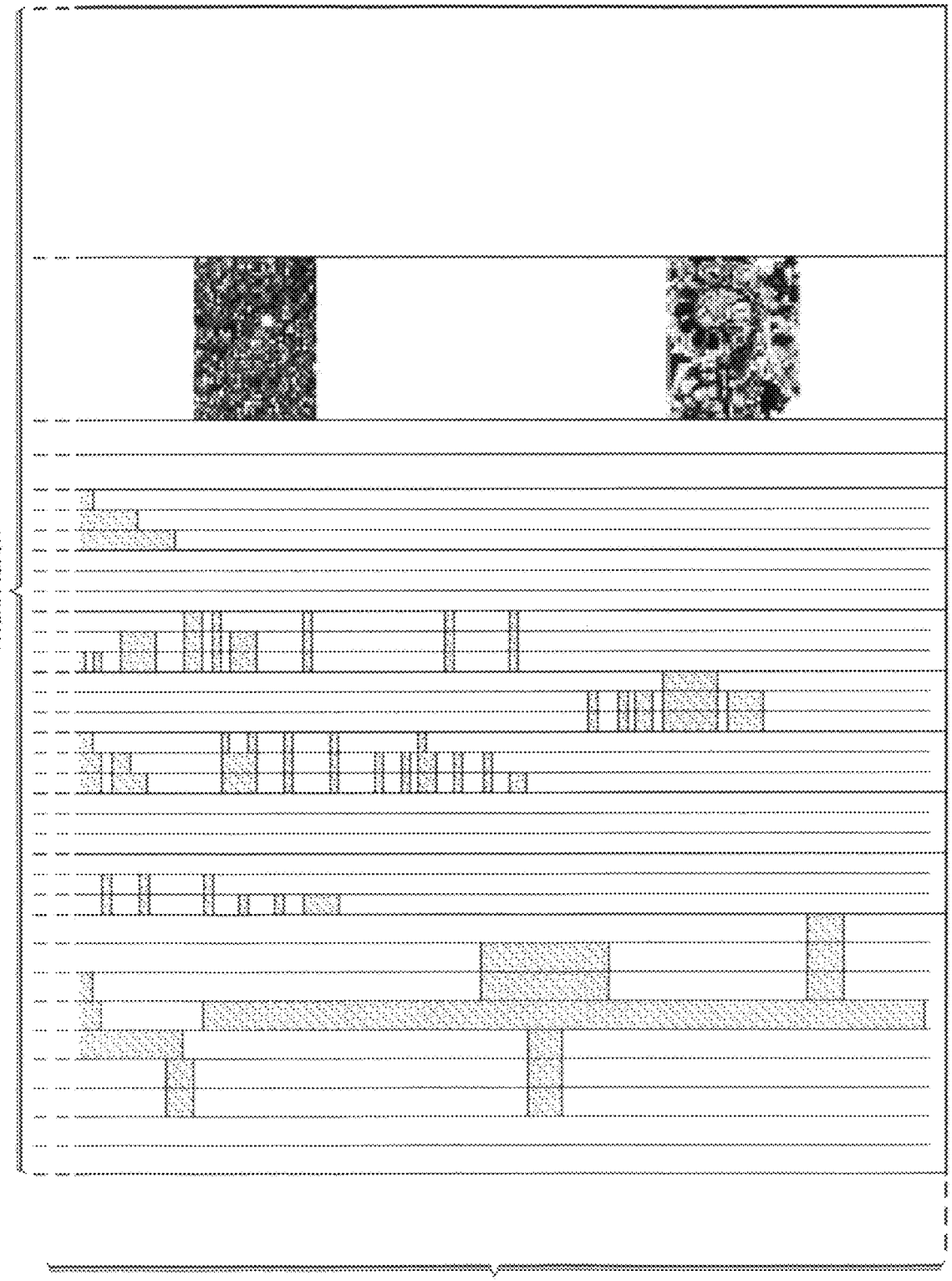

SANDSTONE: LIGHT GRAY, FINE (L)
WELL SORTED, FAINT CROSS BEDDING
WITH SILTY PARTINGS, LOW ANGLE
AND CONJEGATE SETS OF STRESS
RELIEF PARTINGS, WELL CEMENTED

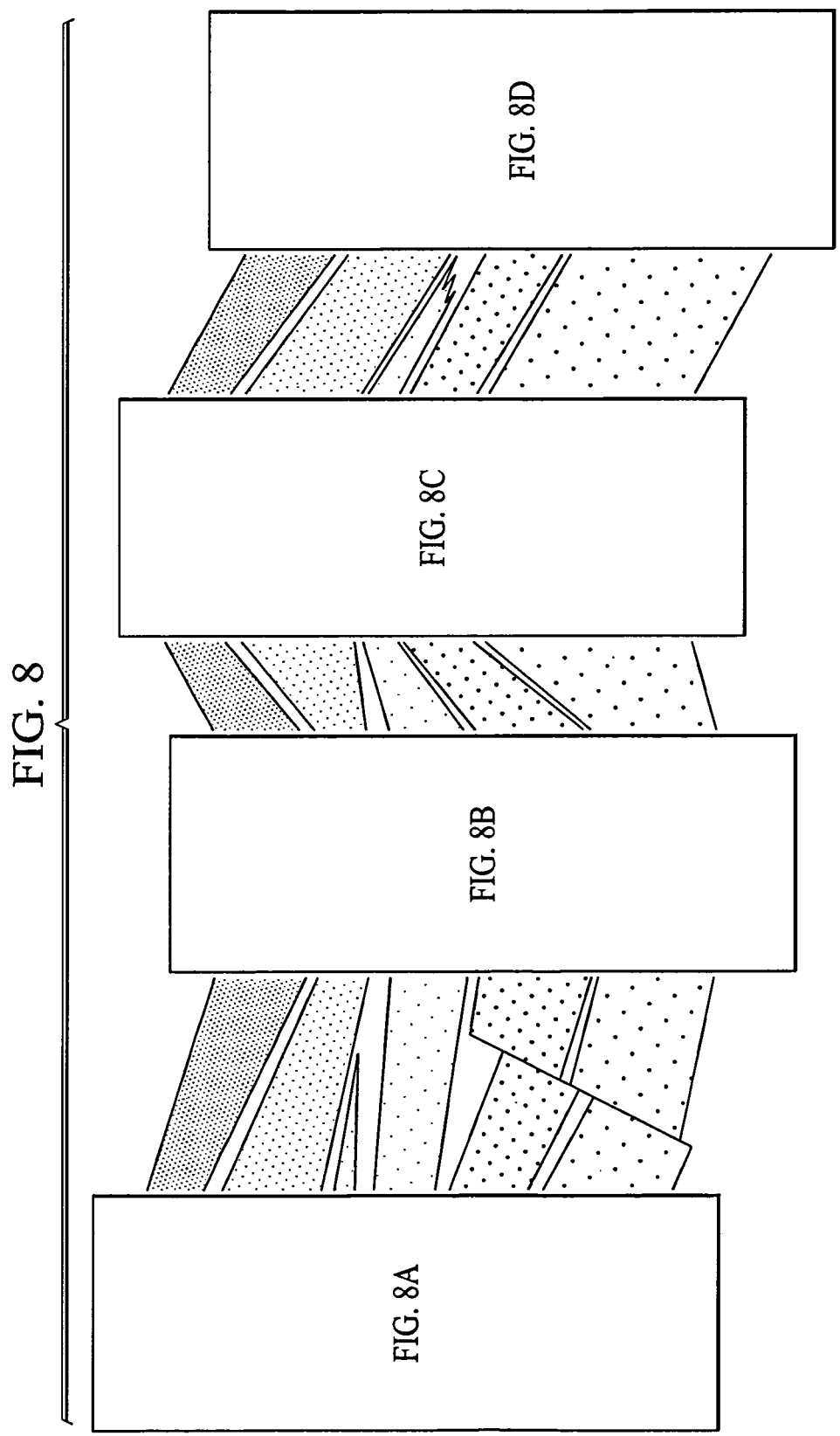

CORE-PLUG TO GIGA-CELLS LITHOLOGICAL MODELING

CROSS REFERENCE TO RELATED APPLICATIONS

This application claims priority from U.S. Provisional Application No. 61/534,988, filed Sep. 15, 2011. For purposes of United States patent practice, this application incorporates the contents of the Provisional application by reference in entirety.

BACKGROUND OF THE INVENTION

1. Field of the Invention

The present invention relates to reservoir characterization and lithological modeling of subsurface earth formations.

2. Description of the Related Art

In the oil and gas industries, the development of underground hydrocarbon reservoirs typically includes development and analysis of computer simulation models. These underground hydrocarbon reservoirs are typically complex rock formations which contain both a petroleum fluid mixture and water.

Oil and gas companies have come to depend on geological models as an important tool to enhance the ability to exploit a petroleum reserve. Geological models of reservoirs and oil/gas fields have become increasingly large and complex. In such models, the reservoir is organized into a number of individual cells. Seismic data with increasing accuracy has permitted the cells to be on the order of 25 meters areal (x and y axis) intervals. For what are known as giant reservoirs, the number of cells are at the least hundreds of millions, and reservoirs of what is known as giga-cell size (a billion cells or ore) are encountered.

When characterizing and developing a reservoir field, a 3D geological model of the reservoir covering the entire 3D reservoir has been required to be built to provide an accurate model for reservoir planning. Accurate indications of lithofacies are an essential input in a 3D geological modeling system. Lithofacies is based on data from wells and establishes as a basis to predict reservoir properties in cells with no well data. One of the sets of data available has been what is known are formation rock descriptions or characterizations which are made by analysts based on observations made from well core samples.

Traditionally, well core data has been assembled and analyzed based on measurements and observations taken from well core samples obtained from formation rock adjacent well boreholes at a number of depths of interest in a well. So far as is known, the core description has been hand drawn and was thereafter available for use in the form of a paper copy or at best a scanned graphical image of the hand drawing. The completed well core data description in the form of notes, comments and observations was then provided to reservoir analysts for their use in lithological modeling and geologic interpretation of subsurface formations of interest. The core description may have also contained what is known as ground truth information, but due to its paper format, made little contribution to the digital geological modeling system. While these forms of well core data conveyed the well core information, the static graphics image in this form prevented analysts from manipulation functions like those known as stretching and squeezing required in the geological interpretation process. The graphic images of well core data did not indicate the lithology in numbers and therefore lacked the digital contribution into the 3D modeling process.

In addition, manual preparation of these types of well description data presented a tedious challenge in drawing standardized patterns of mineral composition, texture, sedimentary structures based on well core samples repeatedly throughout the length of the well bore. Correlating core description data among different wells which had been described by different people with different scale and size hand drawings was also often problematic. An accurate representation of the exact shape and size of formation rock features of interest in the drawing for tens of occurrences and over several wells in a reservoir was difficult to obtain in a reliable and representative manner.

The images or sketches of well core data descriptions did not lend themselves to digital interpretation and modeling applications. These images were frequently scanned as graphics image files for subsequent use, but an analyst was still provided with a visual image indicating well core data descriptions based on original analysis and formatting of such information. The images could only be displayed in the form of a visual reference picture or image.

SUMMARY OF THE INVENTION

Briefly, the present invention provides a new and improved computer implemented method of simulation of a model of lithofacies of a subsurface reservoir in a computer system which has a processor and a memory. According to the computer processing steps of present invention, well core description data obtained from analysis of well core samples about subsurface features of rock formations adjacent well bores in the subsurface reservoir are received in the computer. The received well core description data are stored in memory of the computer system. A postulated measure of lithofacies of the subsurface reservoir at the well bores is the formed based on the well core description data. The computer then responds to adjustments by an analyst to correlate the postulated measures of lithofacies across the reservoir to form a model of lithofacies of the subsurface reservoir structure, and the model of lithofacies of the subsurface reservoir structure stored in memory of the computer system.

The present invention also provides a new and improved data processing system for computerized simulation of a model of lithofacies of a subsurface reservoir. The data processing system includes a data input receiving well core description data obtained from analysis of well core samples about subsurface features of rock formations adjacent well bores in the subsurface reservoir. The data processing system also includes a memory storing the received well core description data in the computer system, and a processor. According to the present invention, the processor forms a postulated measure of lithofacies of the subsurface reservoir at the well bores based on the well core description data, and then responds to adjustments by an analyst to correlate the postulated measures of lithofacies across the reservoir to form a model of lithofacies of the subsurface reservoir structure. The processor then stores in memory of the computer system the model of lithofacies of the subsurface reservoir structure.

The present invention also provides a new and improved data storage device having stored in a computer readable medium computer operable instructions for causing a data processing system to simulate a model of lithofacies of a subsurface reservoir. The instructions stored in the computer readable medium causing the data processing system to receive well core description data obtained from analysis of well core samples about subsurface features of rock formations adjacent well bores in the subsurface reservoir, and store the received well core description data in memory of the computer system. The instructions also cause the data processing system to form a postulated measure of lithofacies of the subsurface reservoir at the well bores based on the well core description data, and then respond to adjustments by an analyst to correlate the postulated measures of lithofacies across the reservoir to form a model of lithofacies of the subsurface reservoir structure. The stored instructions the cause the data processing system to store the model of lithofacies of the subsurface reservoir structure in the data processing memory.

BRIEF DESCRIPTION OF THE DRAWINGS

FIG. 1 is a diagram indicating the relative arrangement and position of FIG. 1A and FIG. 1B with respect to each other.

FIGS. 1A and 1B when arranged as indicated are a replica of an example prior art hand drawn well core description.

FIG. 5 is a diagram indicating the relative arrangement and position of FIGS. 5A, 5B, 5C, 5D, 5E, 5F, 5G, 5H, 5I, and 5J with respect to each other.

FIGS. 5A, 5B, 5C, 5D, 5E, 5F, 5G, 5H, 5I, and 5J when arranged as indicted in FIG. 5 are a display of a digital well core description according to the present invention for carbonaceous rock.

FIG. 6 is a diagram indicating the relative arrangement and position of FIGS. 6A and 6B.

FIGS. 6A and 6B when arranged as indicated in FIG. 6 are a display of a digital well core description according to the present invention for clastic rock.

FIG. 8 is a display of a group of merged digital well core descriptions and log data like those of FIG. 7 for a group of offset wells in a reservoir and correlation of lithofacies between them.

DETAILED DESCRIPTION OF THE PREFERRED EMBODIMENTS

Figure 1A:
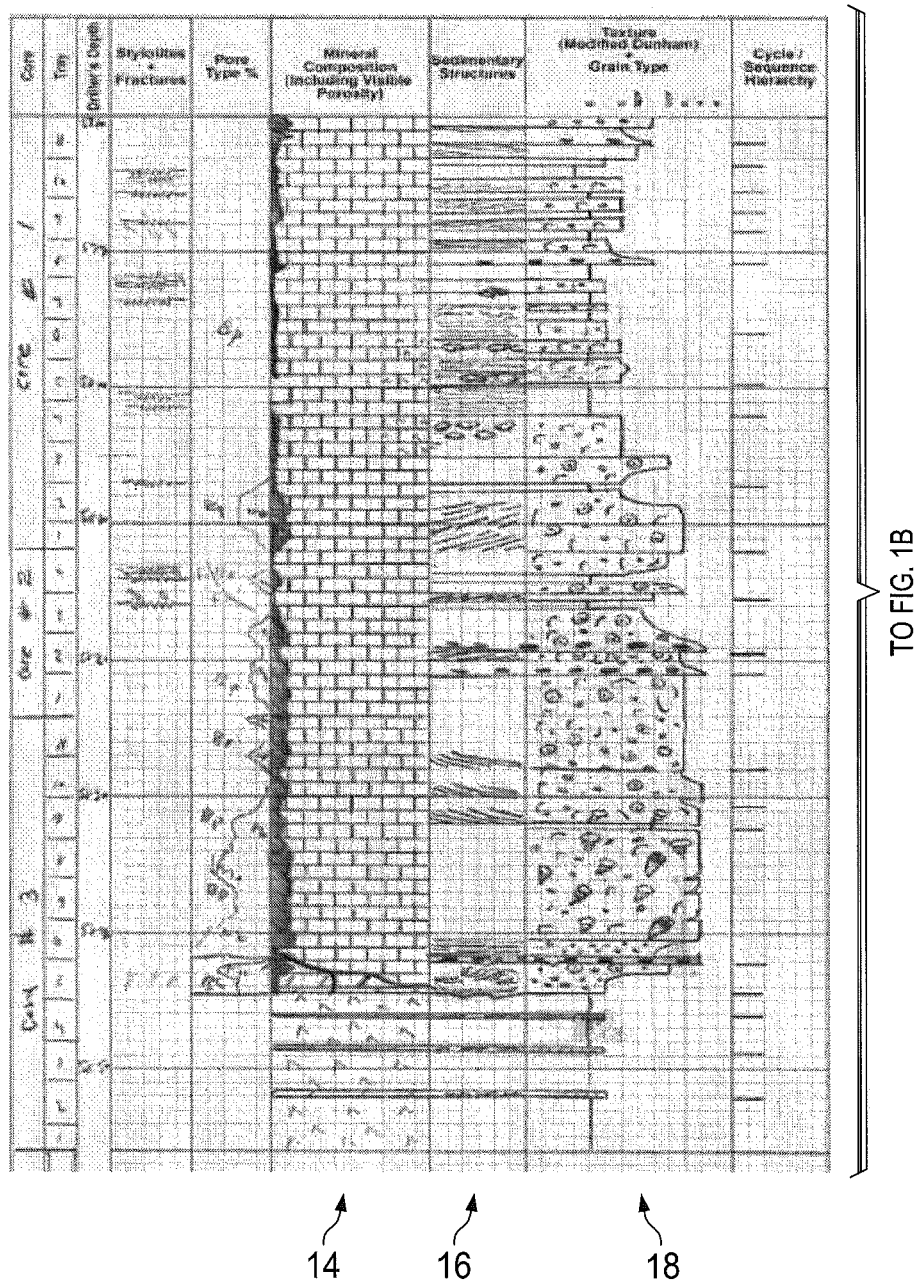
Figure 1B:
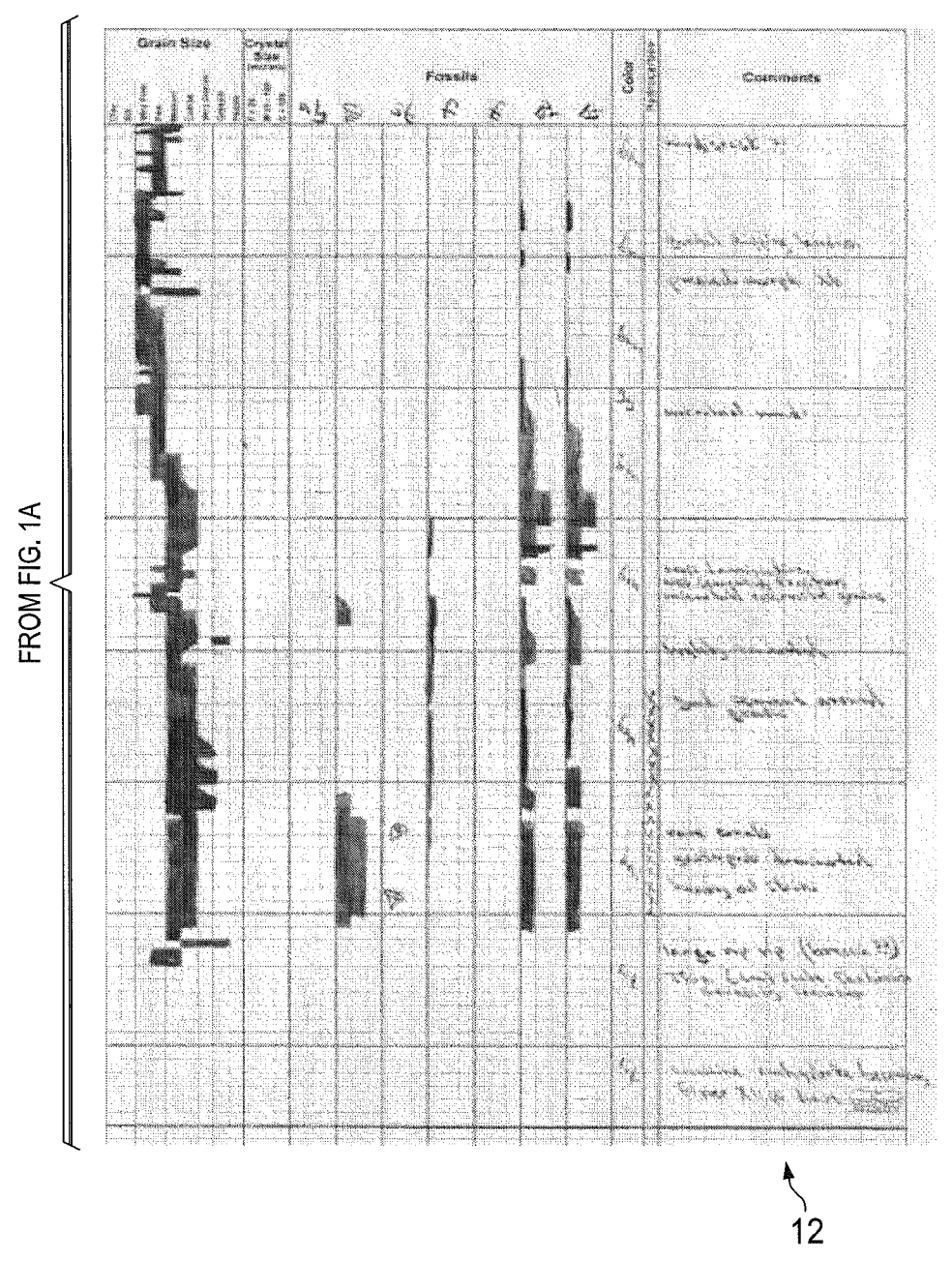

In the drawings, FIGS. 1A and 1B when arranged as indicated in FIG. 1 form a replicated copy of an example prior art well core description data chart or sheet. The subject matter of 1A and 1B is presented as a replica or photostatic image of a well core description data chart or sheet commonly used in the prior art. As can be seen in FIGS. 1A and 1B, the core description data in the chart on FIG. 1 is manually entered by well core analysts based on analysis of well core rock samples and their testing during what is known as core description. Description data typically includes hand written comments as indicated at 12, and sketches using hand drawn symbols regarding mineral composition as shown at 14, sediments as shown at 16 and texture as shown at 18 as well as other observed characteristics of subsurface rock as a function of depth in a well bore of interest. Manual preparation of these types of well description data presented a tedious challenge in drawing standardized patterns of mineral composition, texture, sedimentary structures based on well core samples repeatedly throughout the length of the well bore.

The images or sketches of well core data descriptions exemplified in FIGS. 1A and 1B did not lend themselves to digital interpretation and modeling applications. These images were frequently scanned as graphics image files for subsequent use, but an analyst was still provided with a visual image indicating well core data descriptions based on original analysis and formatting of such information. The images could only be displayed in the form of a visual reference picture or image.

An accurate representation of the exact shape and size of formation rock features of interest in the drawing for tens of occurrences and over several wells in a reservoir was difficult to obtain in a reliable and representative manner. While these forms of well core data conveyed the well core information, the static graphics image in this form prevented analysts from manipulation functions like those known as stretching and squeezing required in the geological interpretation process. The graphic images of well core data did not indicate the lithology in numbers and therefore lacked the digital contribution into the 3D modeling process.

Within the present invention, core description data is entered into memory of a data processing system D (FIG. 4) in the form of digital data. The data is entered for carbonate and clastic rock layers for subsurface formations of interest based on analysis and testing of well core samples. The data may be entered as the well core analysis is being performed during the course of core description by a core analyst, or at a later time based on notes and observations. The well core data description format is organized according to separate templates for the two types of rock layers—carbonaceous (bearing carbon materials) and clastic (formed of pre-existing rock).

The present invention thus takes reservoir rock formation data and establishes carbonate and clastic core description digital templates. Description criteria in carbonate rock can include texture, mineral composition, grain size, and pore type. For clastic rock, it can include grain size, sedimentary structure, lithology, and visual porosity.

Table I below is an example of a template according to the present invention for carbonaceous rock at one well depth of interest from which a core sample has been obtained.

TABLE I

CARBONACEOUS ROCK CORE DESCRIPTION DATA

Stylolites and Fractures
Mineral Composition (including Porosity)
Sedimentary Structure
Texture (Modified Dunham) and Grain Type
Trends
Grain Size Clay
Silt
Very Fine
Fine
Medium
Coarse
Very Coarse
Granule
Pebble
Fossils Molluscs
Brachiopod
Benthic Foraminifera
Algae
Gastropod
Bryozoa
Ostracod
Color
Hydrocarbons
Thin Section Images
Comments Table II below is an example of a template according to the present invention for clastic rock at one well depth of interest from which a core sample has been obtained.

TABLE II

CLASTIC ROCK CORE DESCRIPTION DATA

Trace Fossils Bioturbation Index
Grain Size/Sedimentary Structures

Cobbler Boulder
Pebble
Granules
Very Coarse
Coarse
Coarse Sand
Medium Sand
Fine Sand
Very Fine Sand
Silt
Clay
Lithography
Cements
Sorting Well sorted
Medium
Poor
Visual Porosity E (>20%)
G (15-20%)
M (10-15%)
P (<10%)
Fractures
Hydrocarbons
Remarks It should be understood that the templates of Tables I and II above are given by way of example and that templates identifying other or additional measure, information or comments may be also used according to the present invention.

A flowchart F (FIG. 2) indicates the basic computer processing sequence of the present invention for simulation in a computer system of a model of lithofacies of a subsurface reservoir. The processing sequence of the flow chart F is performed separately for those wells where core samples have been obtained from the formations of interest in the reservoir being modeled.

According to the present invention, well core description data are entered as digital data during step 20 (FIG. 2) into the data processing system D (FIG. 4) through a data input device 50 of a user interface 52. Depending on the type of rock, data entries are made in either the format of the templates such as those of Table I or Table II above. The templates indicate well core description data of interest as a function of depth of in the well bore from which core samples have been obtained. A user enters codes or numbers identifying well description data contained in the template for the formation rock at the depth in the well bore indicated. For comments or observations, text or codes are entered. Well core data description entries in digital form during step 20 may be entered directly as the core sample is being analyzed, or based on earlier well core description data charts or sheets. Digital well core description data entries are made for the depths of interest in the well bores present in the reservoir for which lithological models or studies are to be performed.

The digital well core description data entries are stored during step 22 (FIG. 2) in a database in memory of the data processing system D (FIG. 4) which stores the entered digital data for the various categories identified by the templates. The stored digital well core description data is then available for call up and display during step 24.

Figure 6A:
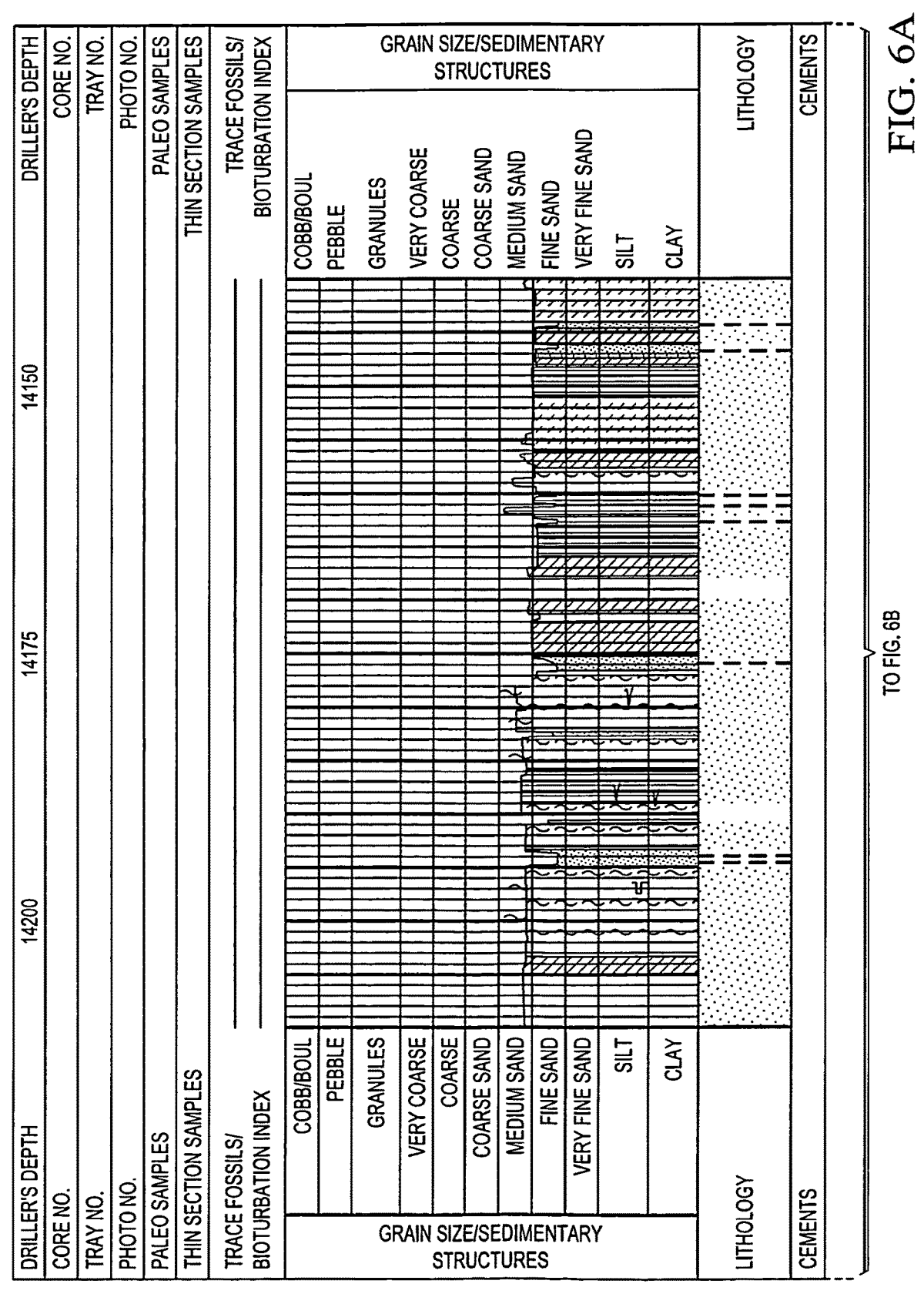

FIGS. 5A, 5B, 5C, 5D, 5E, 5F, 5G, 5H, 5I, and 5J when arranged with respect to each other as indicated in FIG. 5, form an example display of digital well core descriptions along the depth of a well according to the present invention of data using the template of Table I for carbonate rock. FIGS. 6A and 6B when assembled as indicated in FIG. 6 form an example display of digital well core descriptions along the depth of a well according to the present invention of data using the template of Table II for clastic rock.

Figure 2:
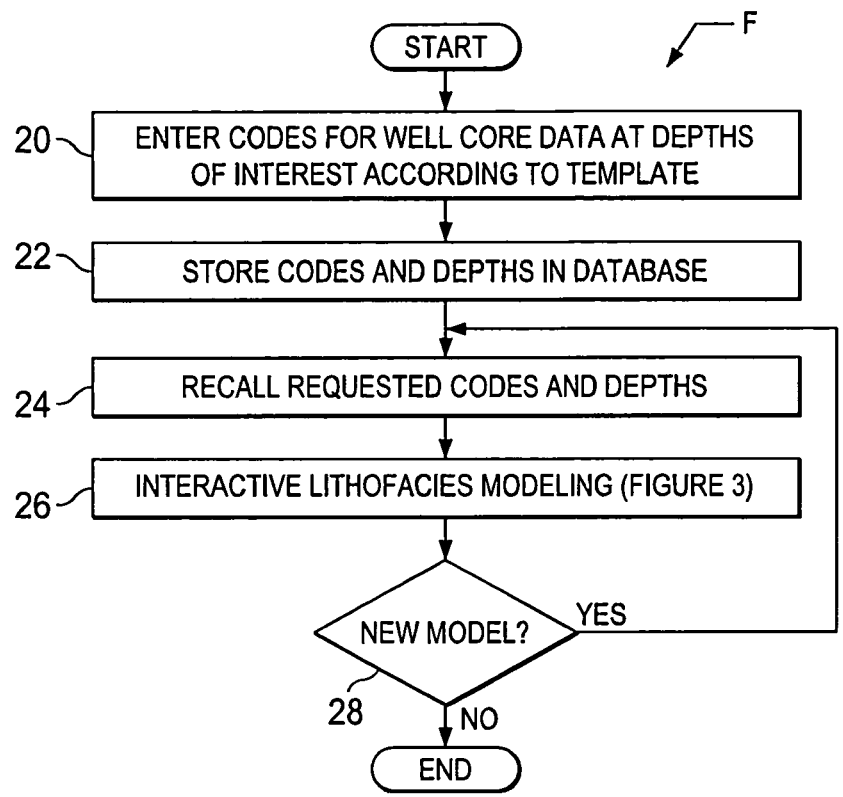
FIG. 2 is a functional block diagram of a set of data processing steps performed in a data processing system for lithological modeling of subsurface earth formations according to the present invention.

As will be set forth, the digital well core data descriptions are processed after entry into the data processing system D by modification, merging, re-formatting of vertical dimensions of the type known as stretching or squeezing and other processing analytical manipulations based on commands or input codes made by the analyst during step 26 (FIG. 2). Details of these operations during step 26 are illustrated in further detail schematically in FIG. 3. On completion of analysis during step 26, a determination is made during step 28 whether or not another lithological model is to be formed. If such is the case, processing returns to step 24; if not, processing is ended.

Figure 3:
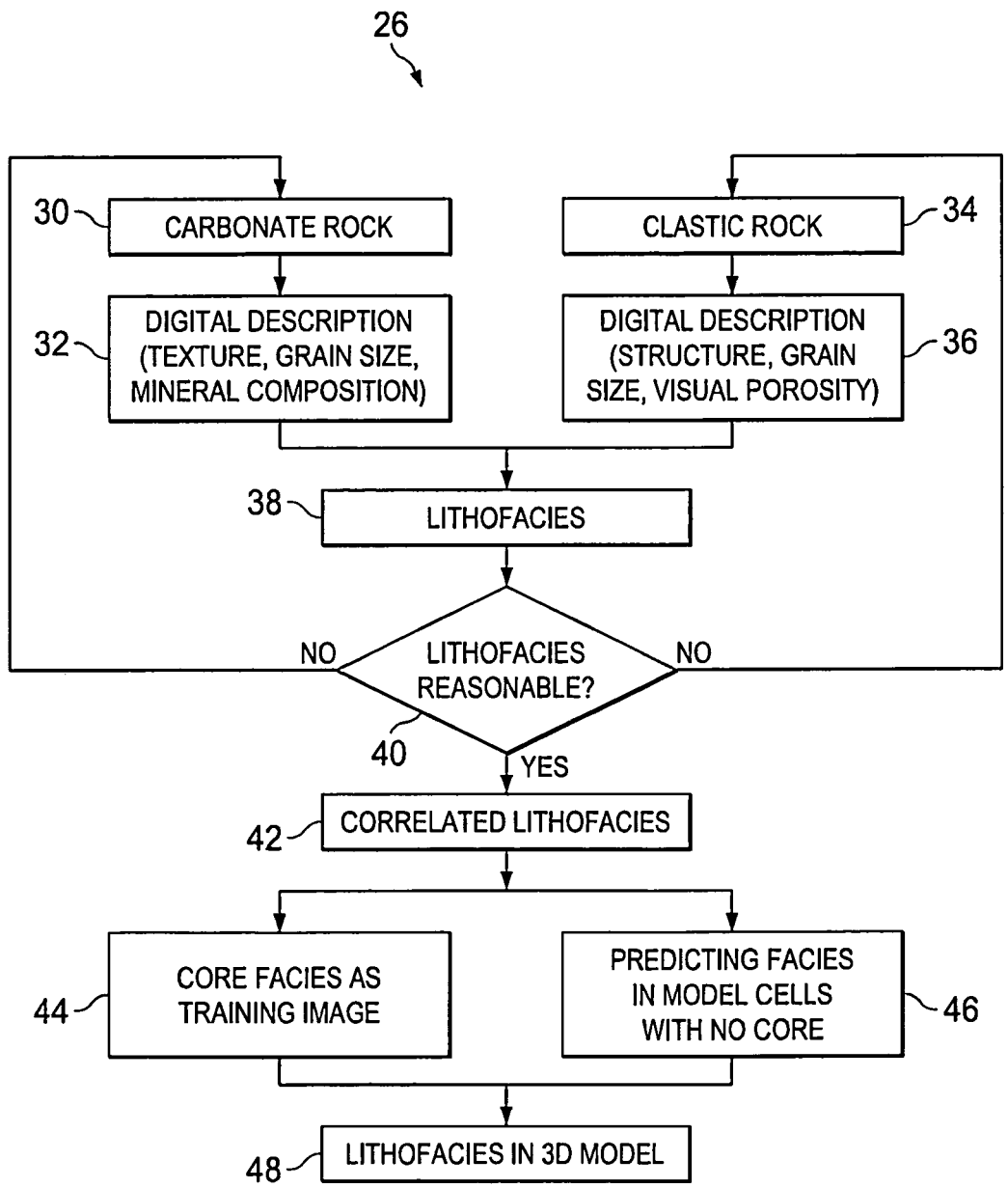
FIG. 3 is a further functional block diagram of a portion of the data processing steps of the functional block diagram of FIG. 2 for lithological modeling of subsurface earth formations according to the present invention.
Figure 5A:
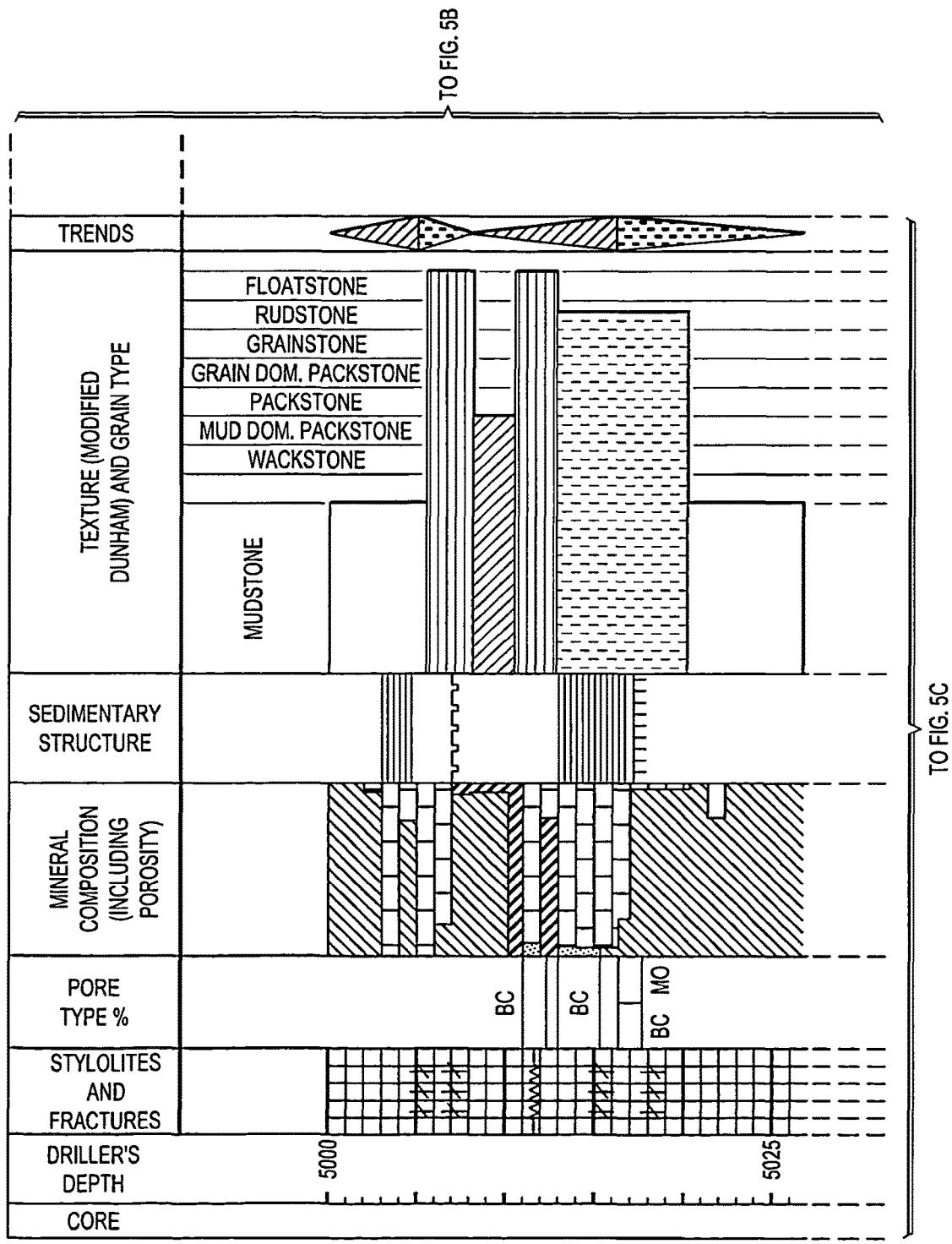
Figure 5C:
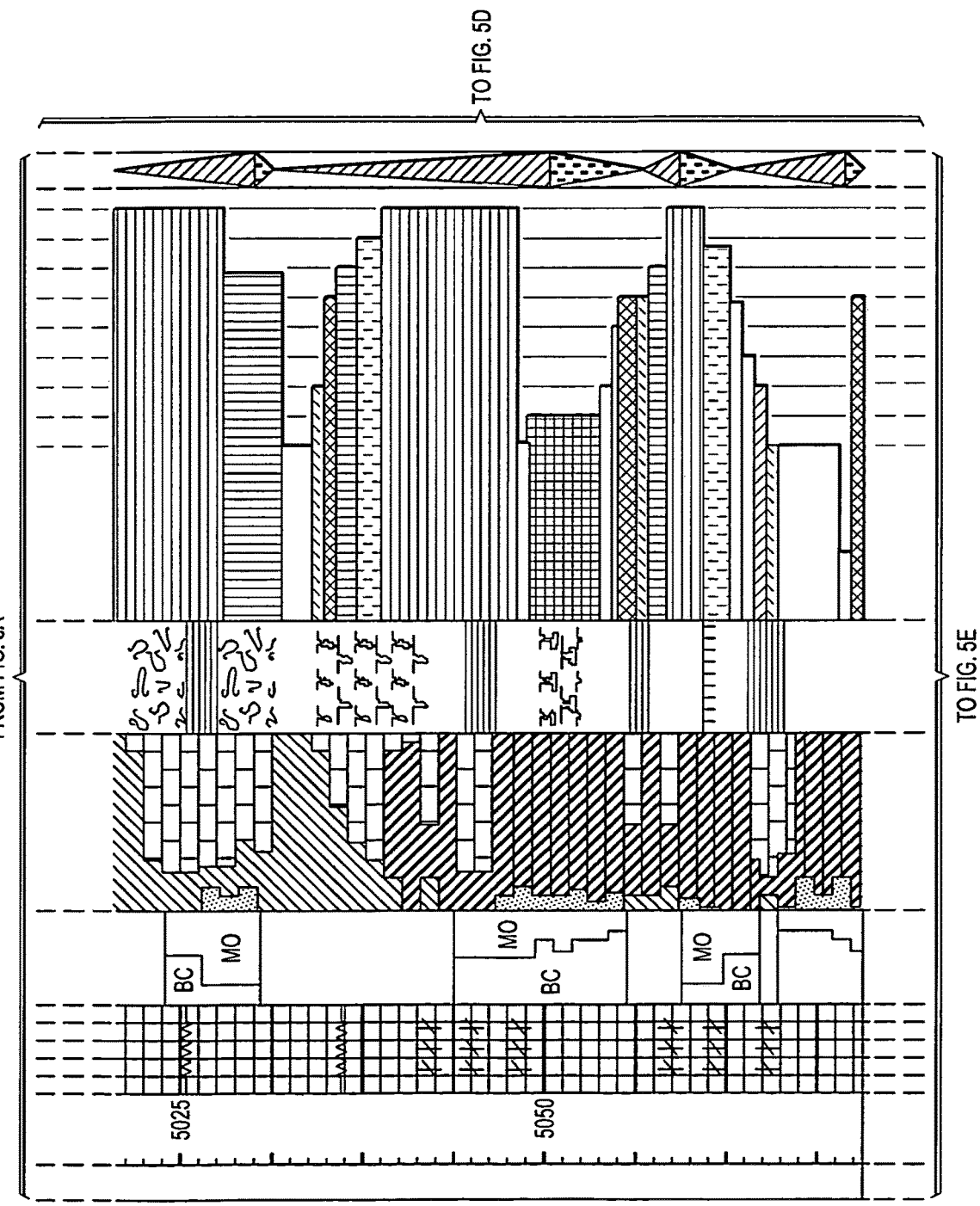
Figure 5D:
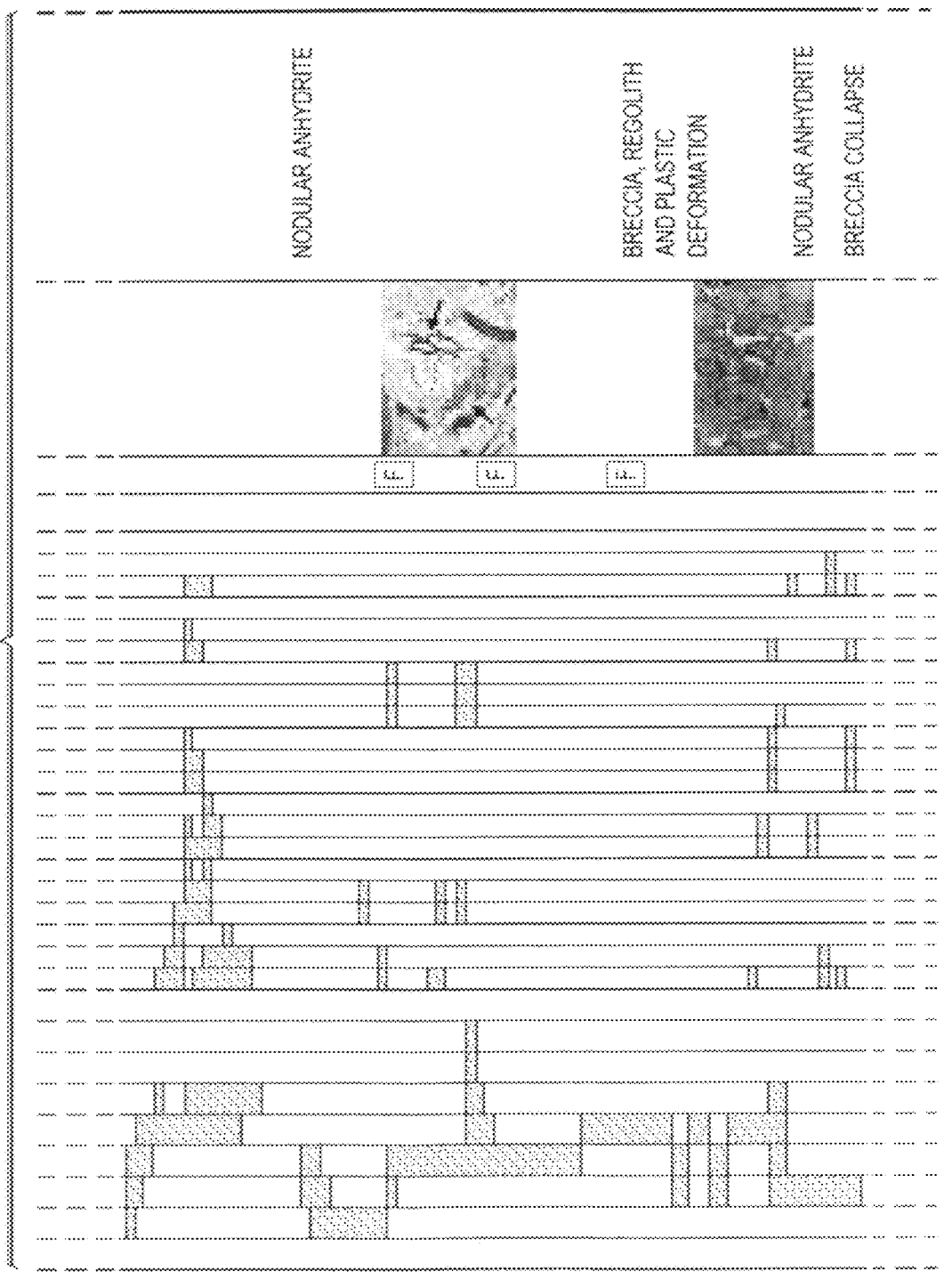
Figure 5E:
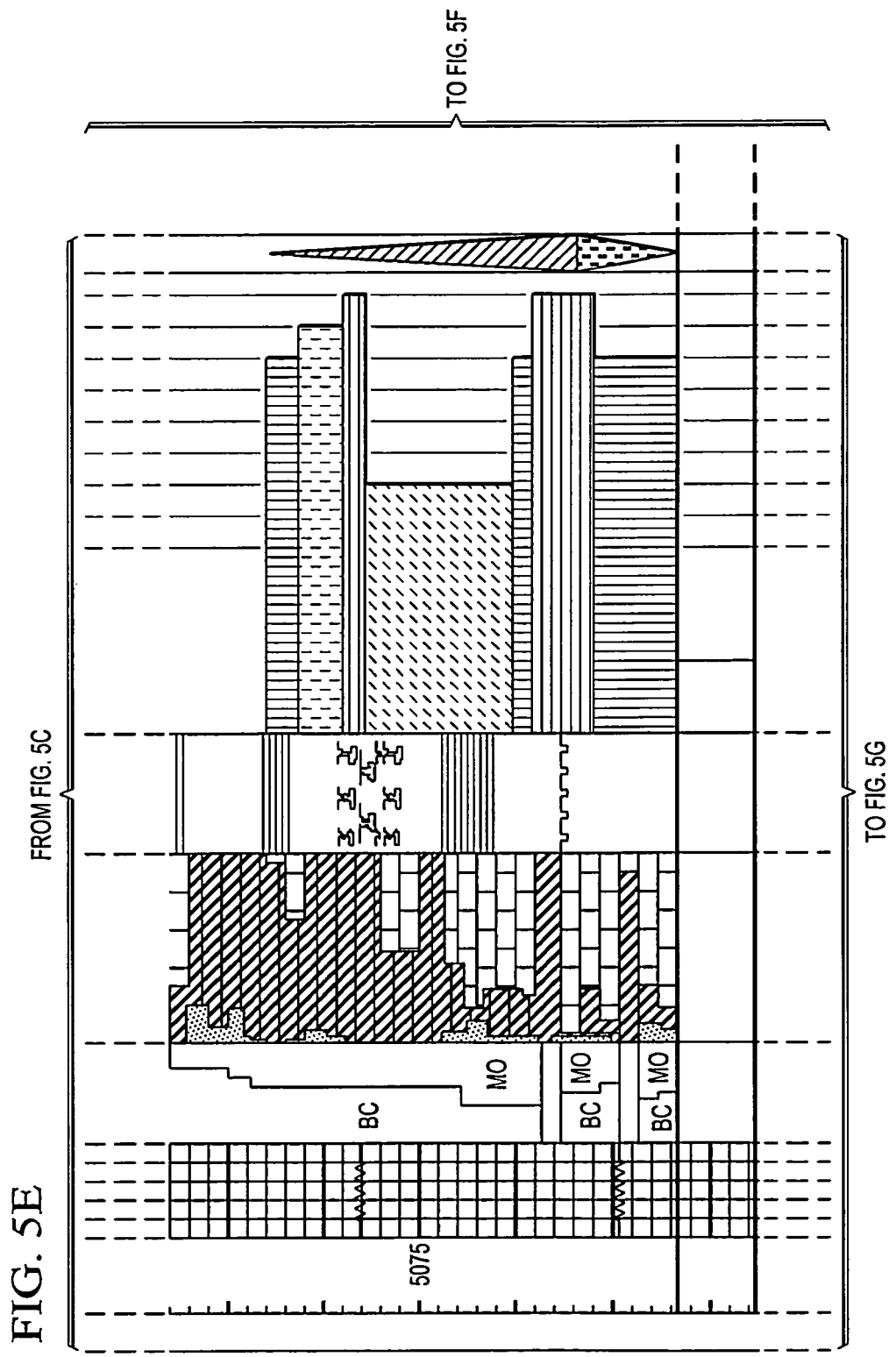
Figure 5F:
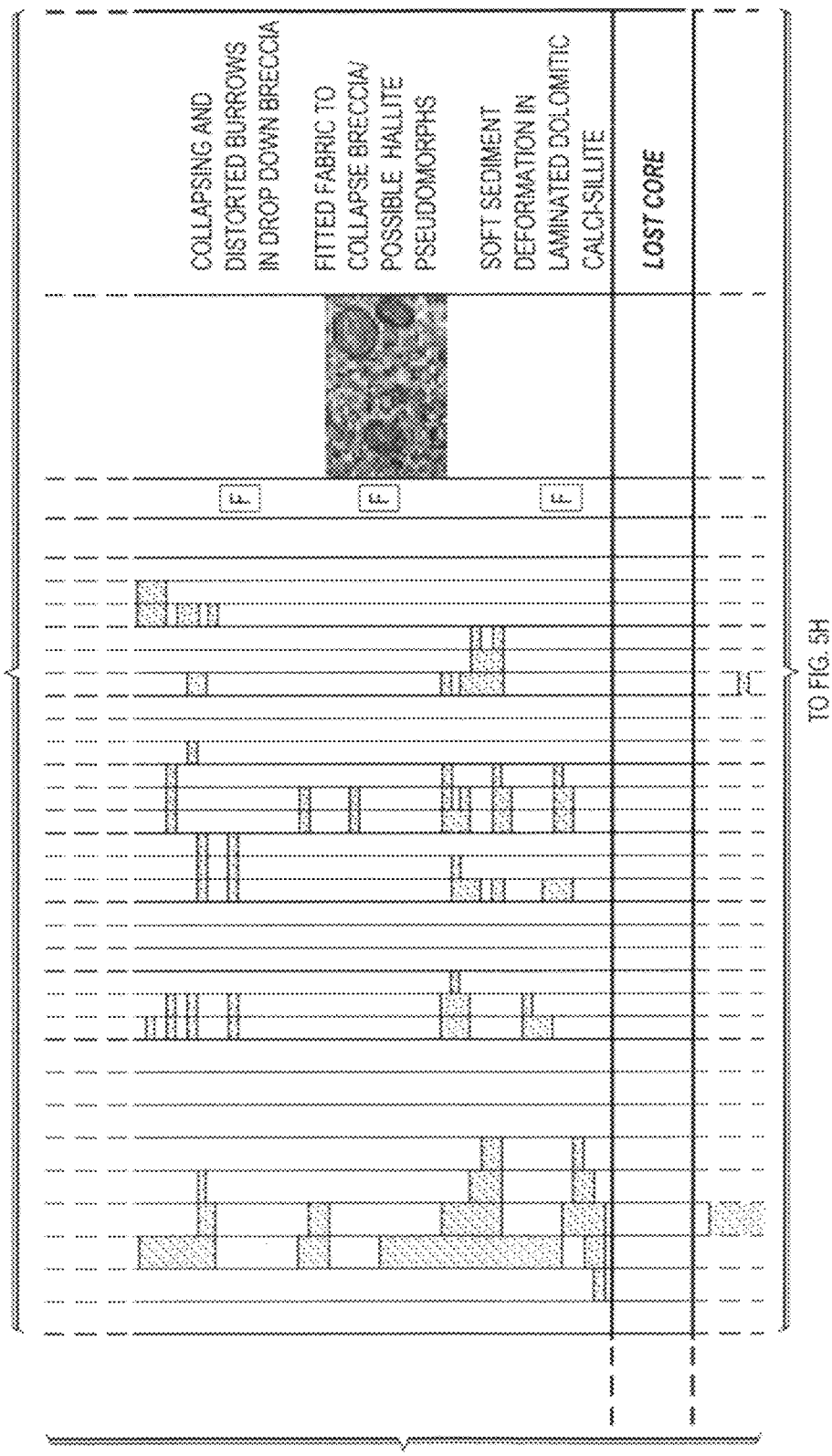
Figure 5G:
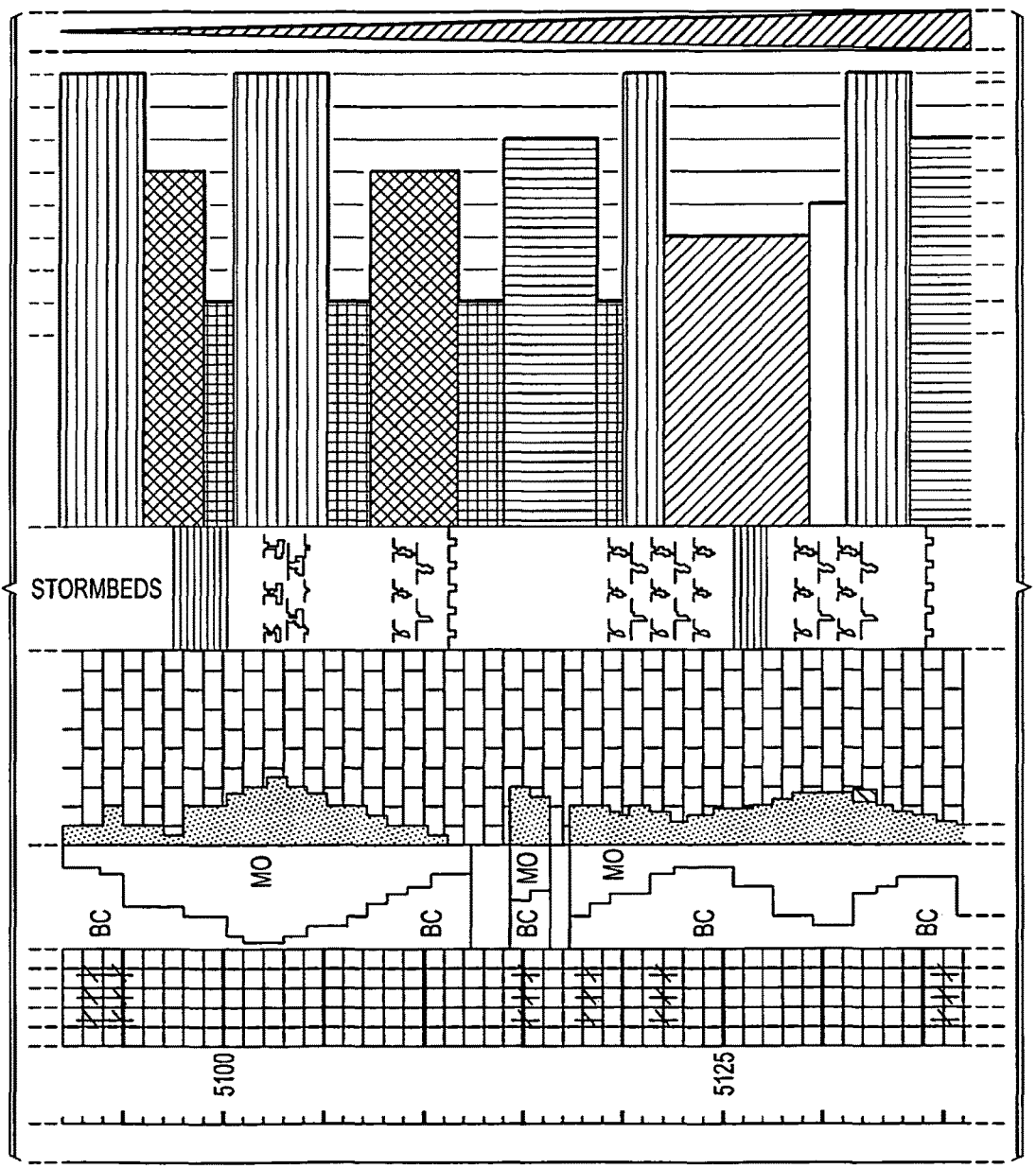
Figure 5I:
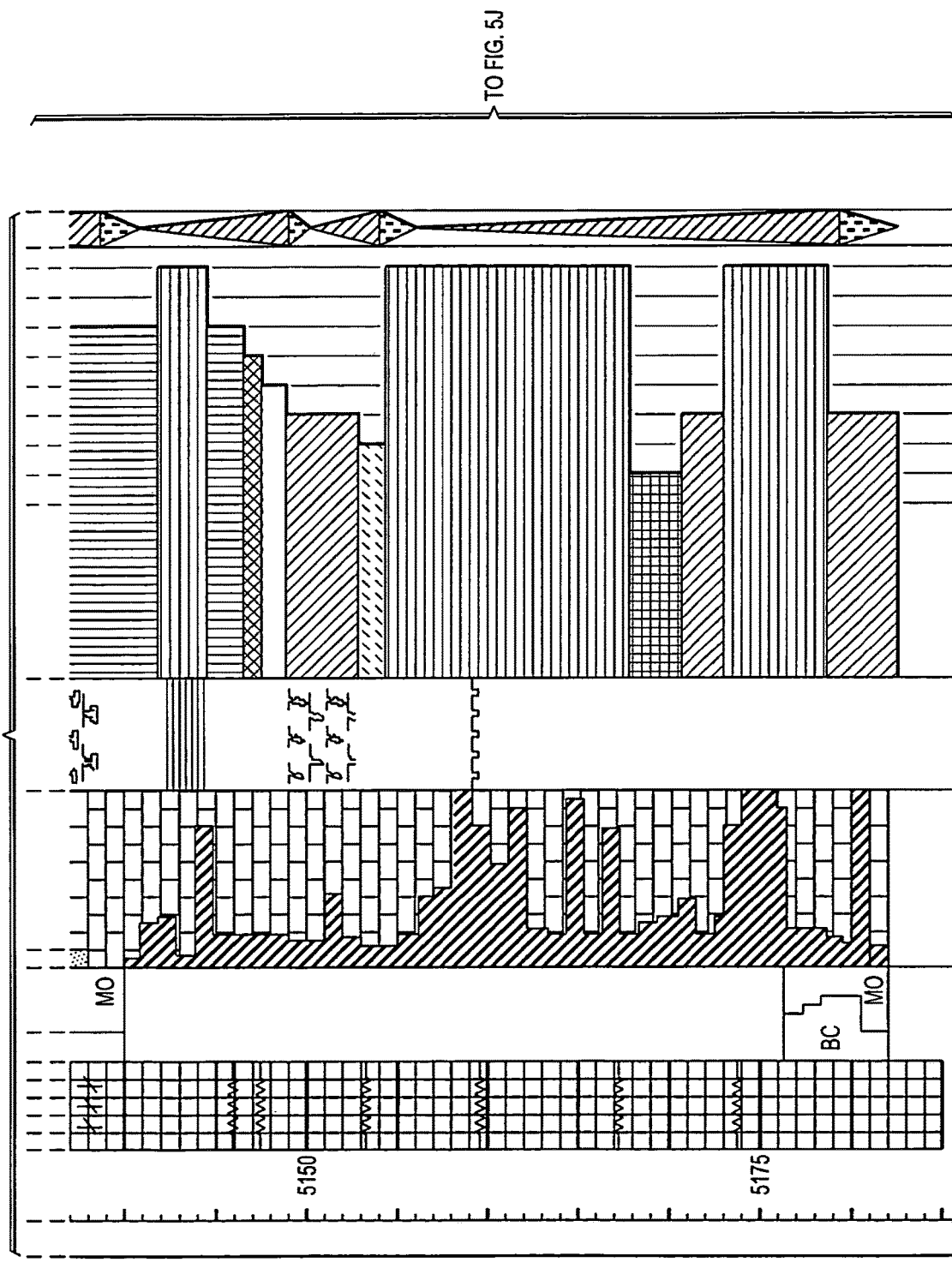

Turning to FIG. 3, details of step 26 of FIG. 2 are set forth. As indicated at step 30, for carbonate rock, the stored digital well core data descriptions of texture, grain size and mineral composition along the depths of interest in memory are present, and are then assembled during step 32. As also indicated at step 34, for clastic rock, the stored digital well core data descriptions of structure, grain size and visual porosity along the depths of interest in memory are present, and are then assembled during step 36.

Figure 7:
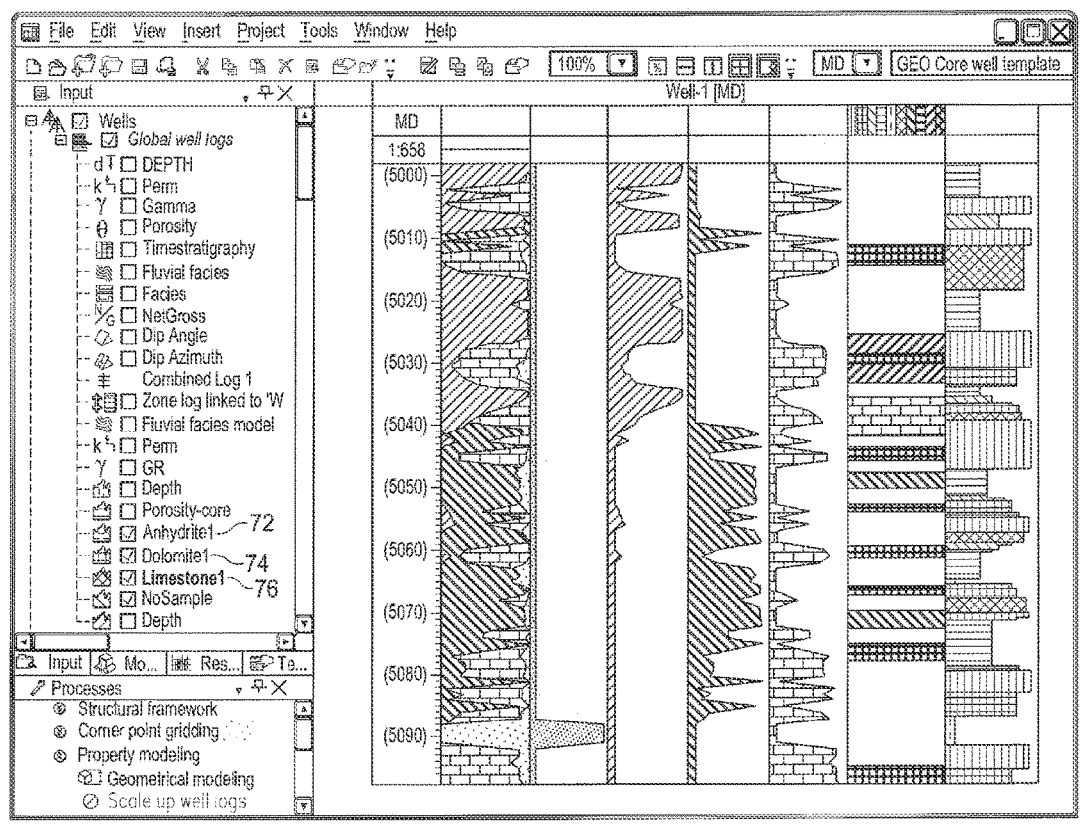
FIG. 7 is an image of a computer display showing merged digital well core description and well log data during lithological modeling according to the present invention.
Figure 8A:
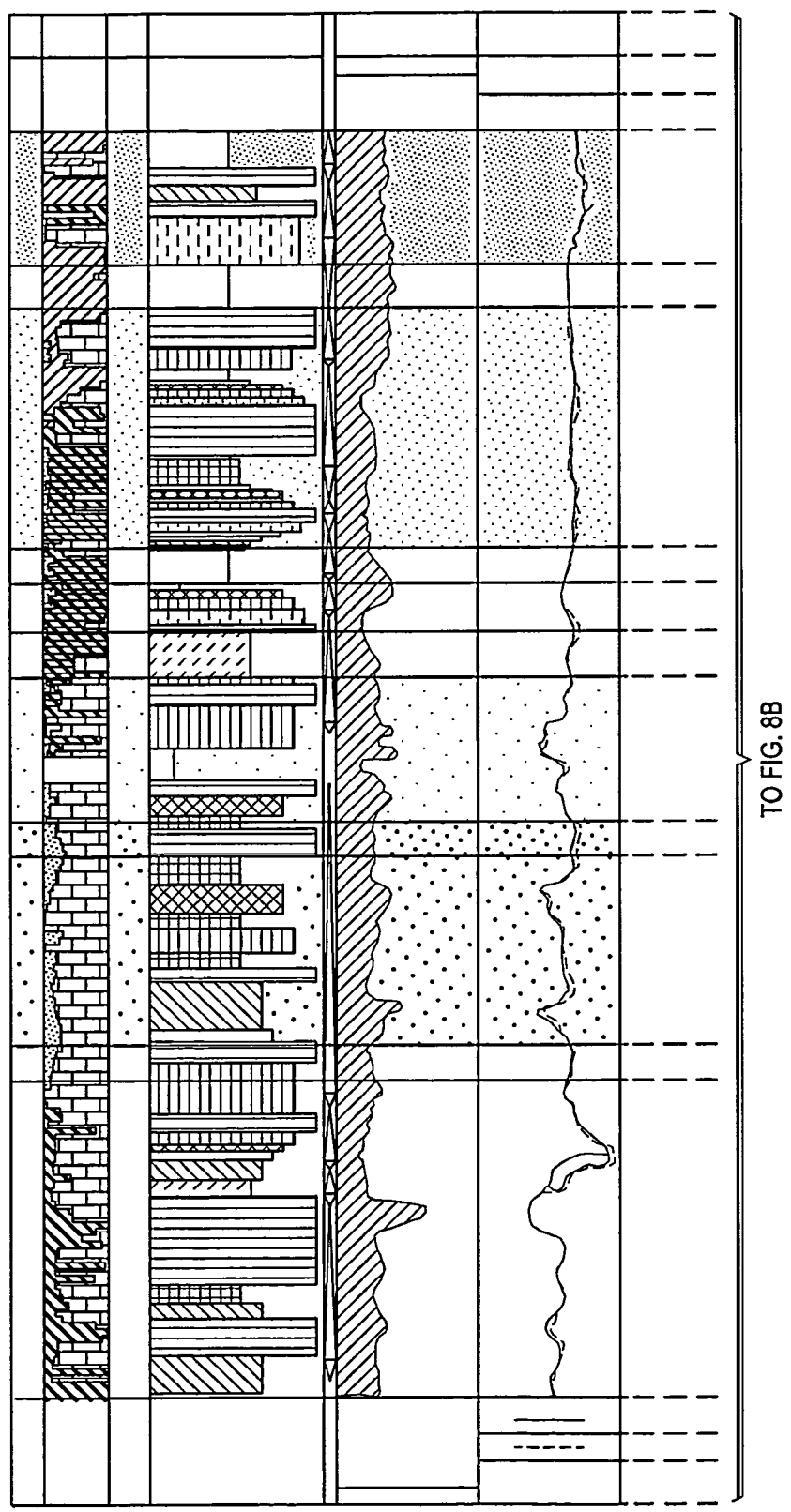
FIG. 8A is a display of one of the merged digital well core descriptions and log data for one of the wells of FIG. 8.
Figure 8B:
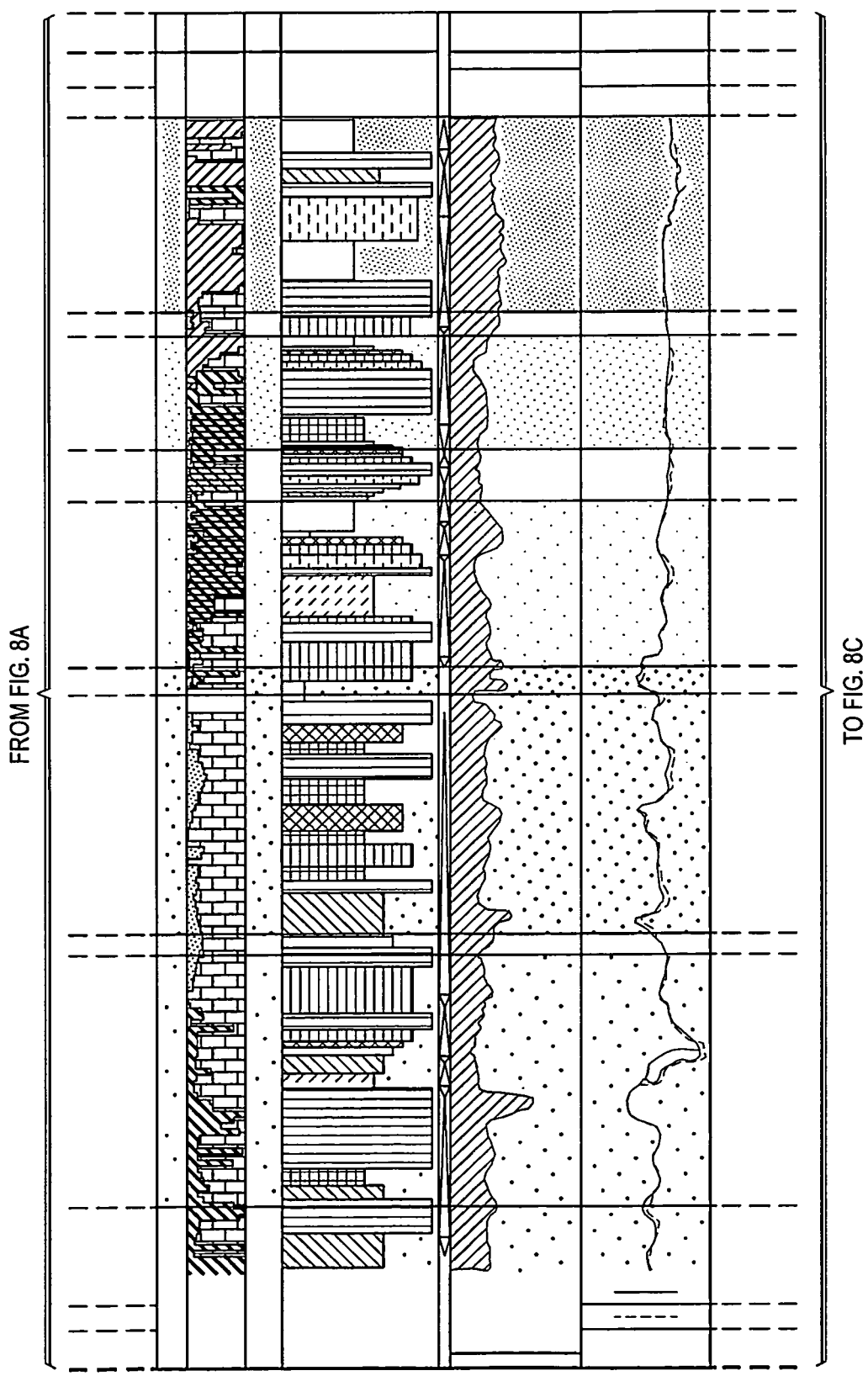
FIG. 8B is a display of the merged digital well core descriptions and log data for another one of the wells of FIG. 8.
Figure 8C:
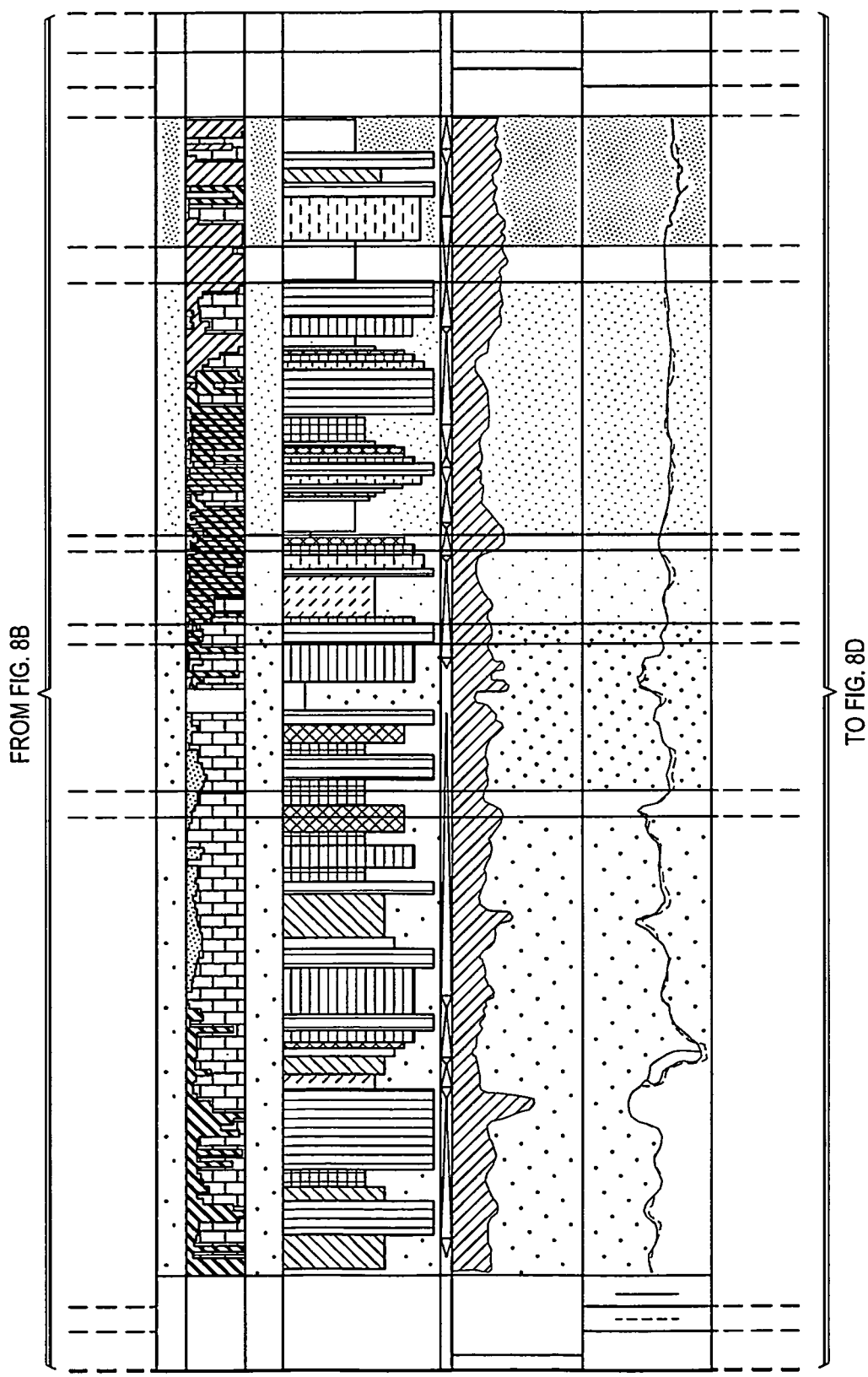
FIG. 8C is a display of the merged digital well core descriptions and log data for another one of the wells of FIG. 8.
Figure 8D:
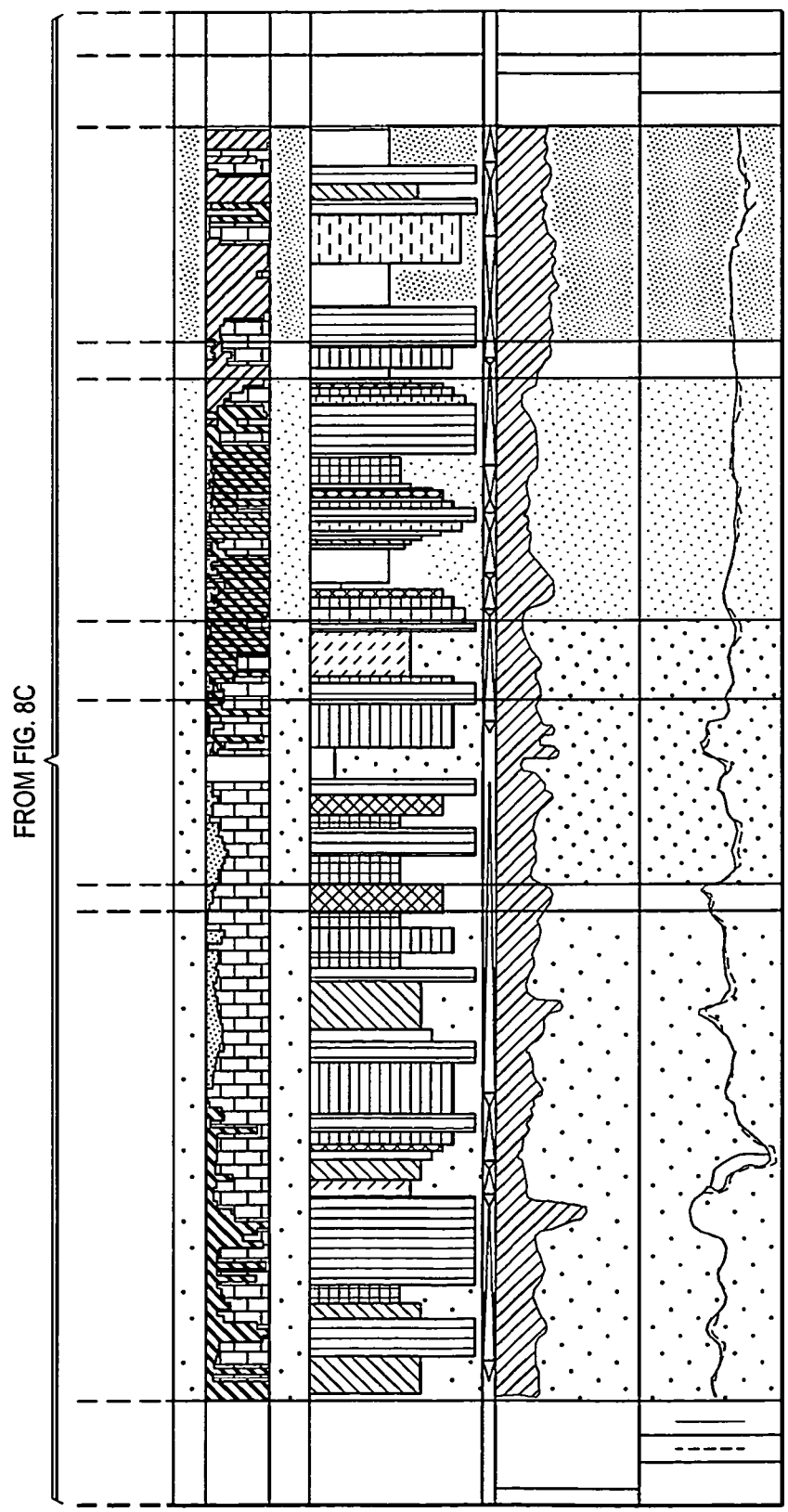
FIG. 8D is a display of one another of the merged digital well core descriptions and log data for another one of the wells of FIG. 8.

As indicated at step 38, a digital lithological model of the reservoir at the location of the well is formed. Data from wireline logs of the same well are merged with the assembled digital well core data descriptions for carbonaceous and clastic rock along the depth of the well bore of interest. The wireline log data are integrated as corresponding or common functions of depth along with the digital well description data and thus calibrated. This permits lithofacies models to be formed. The formed digital lithological model is displayed during step on data display 54 of the data processing system D. FIG. 7 is an example display of a computer screen showing well core description data at 70 merged with well log data obtained from well logs such as Anhydrite, Dolomite, Limestone, and Facies logs as shown at 72, 74 and 76. This figures comes from a digital interpretation system showing the core description has been transformed via the present invention to be as actual digital logs and can be correlated side-by-side with other existing wireline logs (like Gamma Ray) for realistic digital calibration and correlation.

During step 38, (FIG. 3) an assessment is also made by an operator/user of the data processing system D of the displayed digital lithological model such as the one shown in FIG. 7. A determination is made during step 40 whether or not the lithological model is a reasonable one. If such is not the case, processing returns to either or both of step 30 for carbonate rock and step 34 for clastic rock.

If the lithofacies are determined to be reasonable during step 40, processing proceeds to step 42 where a correlated lithofacies is formed. FIG. 8 is an illustration of a plot of the correlation of four derived models of lithofacies like those of FIG. 7 for offset wells in a reservoir of interest. The four lithofacies models of FIG. 8 are shown separately in FIGS. 8A, 8B, 8C and 8D, respectively. An analyst then uses displays like that of FIG. 8 to further define and develop lithofacies information regarding the reservoir being modeled. During this correlation, the digital data may be stretched, scaled and other wise correlated in real time by the analyst as part of the analysis. Core descriptions done on four adjacent wells have been integrated into a digital interpretation system. Through the present invention, these core descriptions can be correlated among four wells adding tremendous insight of the reservoir beyond describing only based on a single well. This digital stretching, squeezing manipulation on core description among wells has not been feasible before when using paper copies, and is accomplished through this invention. The correlated lithofacies is then stored as indicated at step 44 and thereafter available as a training image. This will guide geological model cells where there are no well penetrations to generate reasonable estimate of lithofacies.

Figure 9:
FIG. 9 is a display of an example 3D lithological model according to the present invention of an existing oil reservoir.

The correlated lithofacies for the offset wells of interest in the reservoir is also transferred into a three-dimensional grid model of the reservoir of the known type and data regarding the lithofacies located in storage at cells in the grid according to the locations of the wells in the reservoir grid model. FIG. 9 is an example black and white image of such a three-dimensional grid model. In actual practice, lithofacies along the depth of the well as indicated by colors according to an assigned color key.

Figure 10:
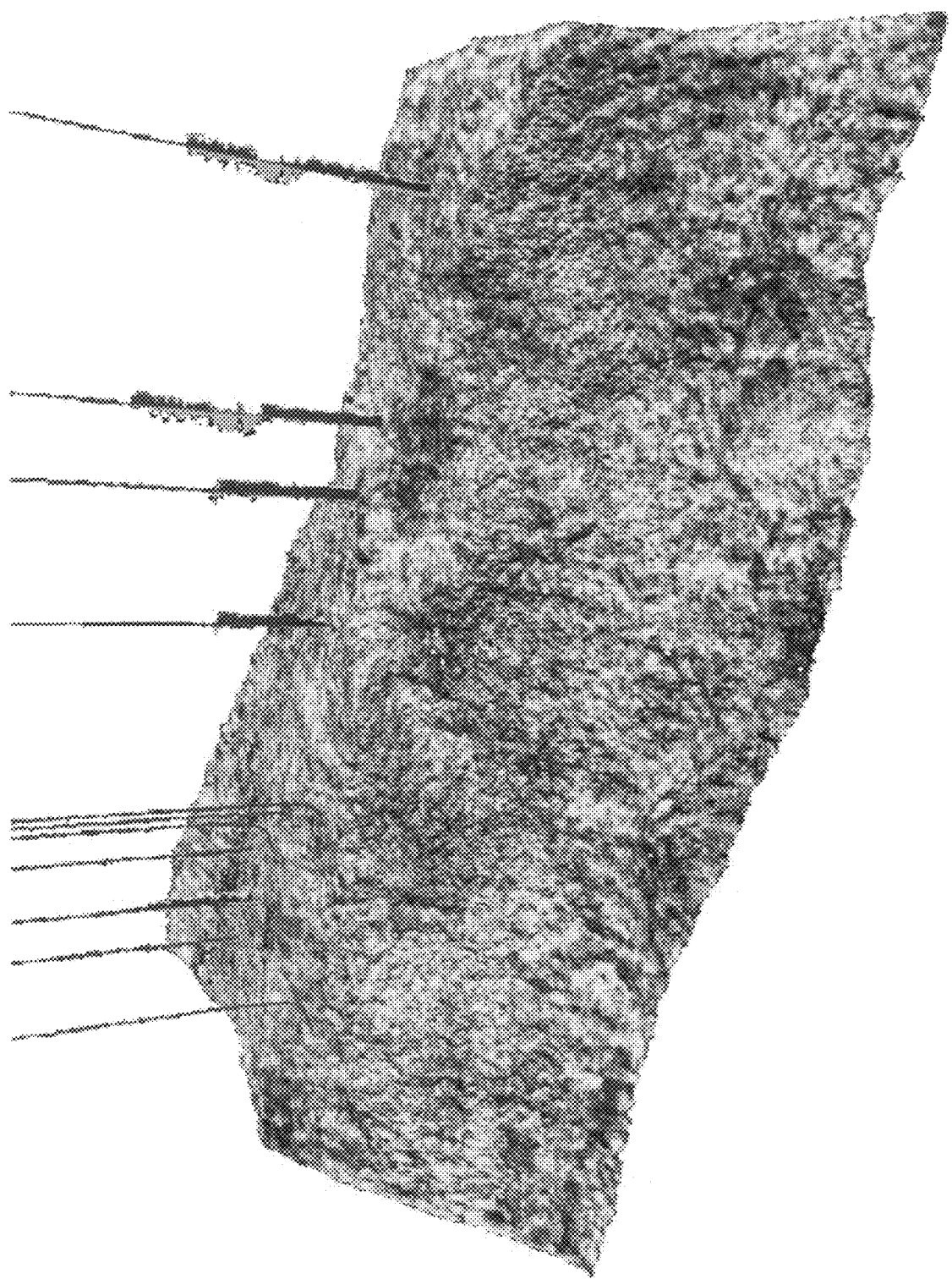
FIG. 10 is an example display of a formation attribute for the reservoir of FIG. 9.

The lithological model data containing lithofacies after storage is also used during step 46 as a basis for postulation or prediction of lithological facies for cells of the reservoir model where no wells are present and consequently no core samples are available. Techniques like neural network are utilized, taking these training images to predict lithofacies in thousands of millions of 3D geological modeling cell locations where no wellbore penetrates or well core is collected. Uncertainty modeling techniques like those of commonly owned, co-pending U.S. patent application Ser. No. 13/193, 086, filed Jul. 28, 2011, "Cluster 3D Petrophysical Uncertainty Modeling", now U.S. Pat. No. 8,731,891, dated May 20, 2014, of which applicant Sung is co-inventor, may also be used for this purpose during step 46. The resultant correlated lithofacies are also used during step 48 to form merged 3D geological models of attributes and lithology of portions of the reservoir of interest. FIG. 10 is an example such display of porosity as a reservoir attribute of an actual giant reservoir where the number of cells exceeds hundreds of millions of cells. The porosity estimation is not just coming from traditional wireline logs but also from well core descriptions. This provides a much more comprehensive approach.

Figure 4:
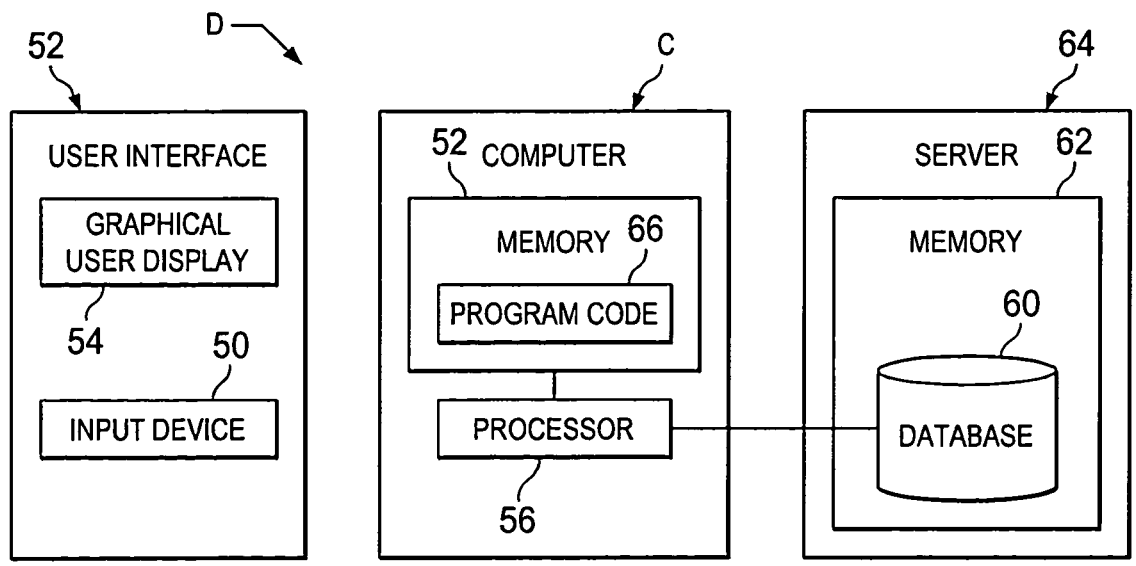
FIG. 4 is a schematic block diagram of a data processing system for lithological modeling of subsurface earth formations according to the present invention.

As illustrated in FIG. 4, a data processing system D according to the present invention includes a computer C having a processor 56 and memory 58 coupled to processor 56 to store operating instructions, control information and database records therein. The computer C may, if desired, be a portable digital processor, such as a personal computer in the form of a laptop computer, notebook computer or other suitable programmed or programmable digital data processing apparatus, such as a desktop computer. It should also be understood that the computer C may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y. or other source.

The computer C has a user interface 52 and an output data display 54 for displaying output data or records of lithological facies and reservoir attributes according to the present invention. The output display 54 includes components such as a printer and an output display screen capable of providing printed output information or visible displays in the form of graphs, data sheets, graphical images, data plots and the like as output records or images.

The user interface 52 of computer C also includes a suitable user input device or input/output control unit 50 to provide a user access to control or access information and database records and operate the computer C. Data processing system D further includes a database 60 stored in computer memory, which may be internal memory 58, or an external, networked, or non-networked memory as indicated at 62 in an associated database server 64.

The data processing system D includes program code 66 stored in memory 58 of the computer C. The program code 66, according to the present invention is in the form of computer operable instructions causing the data processor 56 to perform the computer implemented method of the present invention in the manner described above and illustrated in FIGS. 2 and 3.

It should be noted that program code 66 may be in the form of microcode, programs, routines, or symbolic computer operable languages that provide a specific set of ordered operations that control the functioning of the data processing system D and direct its operation. The instructions of program code 66 may be stored in memory 58 of the computer C, or on computer diskette, magnetic tape, conventional hard disk drive, electronic read-only memory, optical storage device, or other appropriate data storage device having a computer usable medium stored thereon, Program code 66 may also be contained on a data storage device such as server 64 as a computer readable medium, as shown.

The method of the present invention performed in the computer C can be implemented utilizing the computer program steps of FIGS. 2 and 3 stored in memory 58 and executable by system processor 56 of computer C. The input data to processing system D are the well description data of the types indicated in Tables I and II, as well as, well log data and other data regarding the reservoir described above.

From the foregoing, it can be seen that the present invention takes reservoir rock formation data and establishes carbonate and clastic core description digital templates. Description criteria in carbonate rock can include texture, mineral composition, grain size, and pore type. For clastic rock, it can include grain size, sedimentary structure, lithology, and visual porosity. The well core description data can be entered into computer application directly during core description or afterwards.

Wireline logs are integrated to calibrate with well core description to derive lithofacies. Furthermore, the core description and interpretation from one well can then correlate across offset wells core descriptions to refine the lithofacies interpretation. These lithofacies in this invention are exported in digital format to be entered into the 3D geological modeling system. The lithofacies numbers from many wells are also available as hard data and are formulated as a training image. Further, techniques like neural networks are utilized to predict lithofacies in thousands of millions of 3D geological modeling cell locations where no wellbore has penetrated or well core data has been collected. A geology realistic model of the reservoir and its attributes of interest can thus be provided with the present invention.

The digital well core data description according to the present invention defines reservoir rock formations one time at data entry. The well core data description can be called upon repeatedly and utilized throughout the process of lithological modeling during the life of the reservoir with the same precision. The time saving over prior manual well core description processes is substantial. The digital description can be stretched, scaled, and correlated on the fly, as has been noted.

The present invention thus makes available lithological data in the form of actual numbers indicating the lithofacies throughout the whole range of core data. This provides the capability of having available for processing in a data processing system numerical inputs for lithofacies to a 3D geological modeling system.

Well core data organized and processed according to the present invention can be displayed on the well in the digital interpretation and modeling system as a visual reference. The well core data are generated as digital numbers, which can be highly useful to accurate 3D geological modeling.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of forming a model of lithofacies of a subsurface reservoir, the model of lithofacies being partitioned into a number of reservoir cells arranged into an organized three-dimensional system of grid cells, the model of lithofacies providing lithofacies data in digital form as a three-dimensional geological model of lithology of the reservoir, including areas of the reservoir where no wells are present, for reservoir planning and development of the subsurface reservoir, the subsurface reservoir having a plurality of wells therein from which well log data are obtained as functions of depth, the plurality of wells from which well log data are obtained including wells of interest from which well core samples are obtained; the subsurface reservoir containing carbonate rock and clastic rock; the reservoir cells of the model including (1) well grid cells adjacent the well bores, and (2) reservoir grid cells where no wells are present in the reservoir, and no well log data and no well core sample data have been obtained; the model of lithofacies further being based on (1) wireline well log data obtained from wireline logs at depths of interest from the plurality of wells from which well logs are obtained; and (2) well core description data about formation rock of the subsurface reservoir obtained from analysis of the well core samples from the wells of interest in the subsurface reservoir, the method being performed in a computer system having a processor, a graphical user display and a memory, the method comprising the computer processing steps of:

(a) storing in the memory of the computer system program instructions to control operation of the computer system to form the model of lithofacies as a three-dimensional geological model of lithology of the reservoir, including areas of the reservoir where no wells are present, for reservoir planning and development of the reservoir;

(b) receiving, in the memory under control of the stored program instructions, the well core description data of carbonate rock, the well core description data of the carbonate rock comprising physical properties of carbonate rock adjacent the well bores from which well core samples are obtained, the physical properties of the carbonate rock comprising texture, grain size, and mineral composition of the carbonate rock;

(c) receiving, the memory under control of the stored program instructions, the well core description data of clastic rock, the well core description data of the clastic rock comprising physical properties of clastic rock adjacent the well bores from which well core samples are obtained, the physical properties of the clastic rock comprising structure and grain size of the clastic rock;

(d) assembling in the memory under control of the stored program instructions the well core description data of the carbonate rock received and the well core description data of the clastic rock received to generate assembled well core description data for the carbonate rock and the clastic rock comprising the texture, the grain size and the mineral composition of the carbonate rock and the structure and the grain size of the clastic rock;

(e) merging, for each of the wells of interest, the wireline well log data obtained from the wireline logs of the wells of interest with the assembled well core description data to generate merged well data for the well, the merging comprising associating the wireline well log data and the texture, the grain size and the mineral composition of the carbonate rock and the structure and the grain size of clastic rock of the assembled well core description data for common depths within the well;

(f) correlating the wireline log data and assembled well core description data of the merged well data at common depths in the wells of interest to generate correlated lithofacies for the wells of interest;

(g) transferring the correlated lithofacies for the wells of interest into the well grid cells according to the locations of the wells in the three-dimensional system of cells of the reservoir model, the correlated lithofacies transferred into each well grid cell comprising physical properties of rock associated with the well grid cell, the physical properties transferred into each well grid cell comprising texture, grain size and mineral composition of carbonate rock associated with a location of the grid cell, and structure and grain size of clastic rock associated with the location of the grid cell;

(h) forming, with the processor by uncertainty modeling under control of the stored program instructions, predicted measures of lithofacies for the reservoir grid cells where no wells are present, the uncertainty modeling comprising neural network processing by the processor utilizing the transferred correlated lithofacies in the well grid cells as a training model, the predicted measures of lithofacies for each well grid cell where no wells are present comprising physical properties of rock associated with the well grid cell where no wells are present, the physical properties of rock associated with each well grid cell where no wells are present comprising texture, grain size and mineral composition of carbonate rock associated with a location of the grid cell, and structure and grain size of clastic rock associated with the location of the grid cell;

(i) forming, with the processor under control of the stored program instructions, the model of lithofacies of the subsurface reservoir from:
  (1) the correlated lithofacies transferred into the well grid cells according to the locations of the wells in the reservoir; and
  (2) the predicted measures of lithofacies for the reservoir grid cells where no wells are present;

(j) storing, in the memory of the computer system under control of the stored program instructions, the model of lithofacies of the subsurface reservoir; and (k) forming, with the graphical user display under control of the stored program instructions, an image of the model of lithofacies for the subsurface reservoir as a geological model of lithology of the subsurface reservoir for reservoir planning and development.

2. The computer implemented method of claim 1, wherein the physical properties of the carbonate rock further includes pore type of the carbonate rock.

3. The computer implemented method of claim 1, wherein the physical properties of the clastic rock further includes lithology of the clastic rock.

4. The method of claim 1, wherein the step of forming an image of the model further comprises the step of:
  forming an output display of the wireline well logs at the depth of interest correlated with the model of lithofacies.

5. The method of claim 1, further comprising:
  (e2) forming, based on the merged well data, a lithological model;
  (e3) displaying the lithological model for review by a user;
  (e4) receiving, responsive to the display of the lithological model, an indication from the user that the lithological model is reasonable,
  wherein the correlating of the wireline log data and the assembled well core description data of the merged well data is responsive to receiving the indication that the lithological model is reasonable, and wherein the correlating comprises an interactive correlating comprising:
    displaying of a derived model of lithofacies for each of the wells of interest, and a plot of digital data representing a proposed correlation of lithofacies of the wells of interest;
    receiving, from a user, digital manipulation of the digital data representing the proposed correlation of lithofacies of the wells of interest; and
    generating, based on the digital manipulation of the digital data representing the proposed correlations of lithofacies of the wells of interest, the correlated lithofacies for the wells of interest.

6. A data processing system for forming a model of lithofacies of a subsurface reservoir, the model of lithofacies being partitioned into a number of reservoir cells arranged into an organized three-dimensional system of grid cells, the model of lithofacies providing lithofacies data in digital form as a three-dimensional geological model of lithology of the reservoir, including areas of the reservoir where no wells are present, for reservoir planning and development of the subsurface reservoir, the subsurface reservoir having a plurality of wells therein from which well log data are obtained as functions of depth, the plurality of wells from which well log data are obtained including wells of interest bores from which well core samples are obtained; the subsurface reservoir containing carbonate rock and clastic rock; the reservoir cells of the model including (1) well grid cells adjacent the well bores, and (2) reservoir grid cells where no wells are present in the reservoir and no well log data and no well core sample data has been obtained; the model of lithofacies further being based on (1) wireline well log data obtained from wireline logs at depths of interest from the plurality of wells from which well logs are obtained; and (2) well core description data about formation rock of the subsurface reservoir obtained from analysis of the well core samples from the plurality of wells of interest in the subsurface reservoir, the data processing system comprising:

(a) a memory storing program instructions to control operation of the data processing system to form the model of lithofacies as a three-dimensional geological model of lithology of the reservoir, including areas of the reservoir where no wells are present, for reservoir planning and development of the reservoir;

(b) a data input, under control of the stored program instructions, receiving, for processing in the data processing system, the well core description data of the carbonate rock, the well core description data of the carbonate rock comprising physical properties of the carbonate rock for the reservoir cells adjacent the well bores from which well core samples are obtained, the physical properties of the carbonate rock comprising texture, grain size and mineral composition of the carbonate rock;

(c) the data input, under control of the stored program instructions, receiving, for processing in the data processing system, the well core description data of the clastic rock, the well core description data of the clastic rock comprising physical properties of the clastic rock for the reservoir cells adjacent the well bores from which well core samples are obtained, the physical properties of the clastic rock comprising structure and grain size of the clastic rock;

(d) a processor assembling and storing in the memory under control of the stored program instructions storing the well core description data of the carbonate rock received and the well core description data of the clastic rock received to generate assembled well core description data for the carbonate rock and the clastic rock comprising the texture, the grain size and the mineral composition of the carbonate rock and the structure and the grain size of the clastic rock;

(e) the processor, under control of the stored program instructions, merging, for each of the wells of interest, the wireline well log data obtained from the wireline logs of the wells from which well core samples are obtained with the assembled well core description data to generate merged well data for the well, the merging comprising associating the wireline well log data and the texture, the grain size and the mineral composition of the carbonate rock and the structure and the grain size of clastic rock of the assembled well core description data for common depths within the well;

(f) the processor correlating the merged wireline log data and assembled well core description data of the merged well data at common depths in the wells of interest to generate correlated lithofacies for the wells of interest;

(g) the processor transferring the correlated lithofacies for the wells of interest into the well grid cells according to the locations of the wells in the three-dimensional system of cells of the reservoir model, the correlated lithofacies transferred into each well grid cell comprising texture, grain size and mineral composition of carbonate rock associated with a location of the grid cell, and structure and grain size of clastic rock associated with the location of the grid cell;

(h) the processor, under control of the stored program instructions, forming by uncertainty modeling predicted measures of lithofacies for the reservoir cells grid where no wells are present, the uncertainty modeling comprising neural network processing by the processor based on the transferred correlated lithofacies in the well grid cells as a training model for the neural network processing, the predicted measures of lithofacies for each well grid cell where no wells are present comprising physical properties of rock associated with the well grid cell where no wells are present, the physical properties of rock associated with each well grid cell where no wells are present comprising texture, grain size and mineral composition of carbonate rock associated with a location of the grid cell, and structure and grain size of clastic rock associated with the location of the grid cell;

(i) the processor under control of the stored program instructions further forming the model of lithofacies of the subsurface reservoir from:
 (1) the correlated lithofacies transferred into the well grid cells according to the locations of the wells in the reservoir; and
 (2) the formed predicted measures of lithofacies for the reservoir grid cells where no wells are present;

(j) the memory under control of the stored program instructions storing the model of lithofacies of the subsurface reservoir; and (k) a graphical user display, under control of the stored program instructions, forming an image of the model of lithofacies for the subsurface reservoir as a geological model of lithology of the subsurface reservoir for reservoir planning and development.

7. The data processing system of claim 6, wherein the physical properties of the carbonate rock further includes pore type of the carbonate rock.

8. The data processing system of claim 6, wherein the physical properties of the clastic rock further includes lithology of the clastic rock.

9. The data processing system of claim 6, wherein the graphical user display further forms an output display of the wireline well logs at the depth of interest correlated with the model of lithofacies.

10. The data processing system of claim 6, further comprising:
 (e2) the processor forming, based on the merged well data, a lithological model that is displayed for review by a user;
 (e4) the processor receiving, responsive to the display of the lithological model, an indication from the user that the lithological model is reasonable,
 wherein the correlating of the wireline log data and the assembled well core description data of the merged well data is responsive to receiving the indication that the lithological model is reasonable, and wherein the correlating comprises an interactive correlating comprising:
  displaying of a derived model of lithofacies for each of the wells of interest, and a plot of digital data representing a proposed correlation of lithofacies of the wells of interest;
  receiving, from a user, digital manipulation of the digital data representing the proposed correlation of lithofacies of the wells of interest; and
  generating, based on the digital manipulation of the digital data representing the proposed correlations of lithofacies of the wells of interest, the correlated lithofacies for the wells of interest.

11. A data storage device having stored in a non-transitory computer readable medium computer operable instructions for causing a data processing system to form a model of lithofacies of a subsurface reservoir, the data processing system comprising processor, a graphical user display and a memory, the model of lithofacies being partitioned into a number of reservoir cells arranged into an organized three-dimensional system of grid cells, the model of lithofacies providing lithofacies data in digital form as a three-dimensional geological model of lithology of the reservoir, including areas of the reservoir where no wells are present, for reservoir planning and development of the subsurface reservoir, the subsurface reservoir having a plurality of wells therein from which well log data are obtained as functions of depth, the plurality of wells from which well log data are obtained including wells of interest from which well core samples are obtained; the subsurface reservoir containing carbonate rock and clastic rock; the reservoir cells of the model including (1) well grid cells adjacent the well bores, and (2) reservoir grid cells where no wells are present in the reservoir and no well log data and no well core sample data have been obtained; the model of lithofacies further being based on (1) wireline well log data obtained from wireline logs at depths of interest from the plurality of wells from which well logs are obtained; and (2) well core description data about formation rock of the subsurface reservoir obtained from analysis of the well core samples from the wells of interest in the subsurface reservoir, the instructions stored as program instructions in the computer readable medium causing the data processing system to perform the steps of:

(a) receiving, in the memory for processing in the data processing system, the well core description data of the carbonate rock, the well core description data of the carbonate rock comprising physical properties of the carbonate rock for the reservoir cells adjacent the well bores from which well core samples are obtained, the physical properties of the carbonate rock comprising texture, grain size and mineral composition of the carbonate rock;

(b) receiving, in the memory for processing in the computer system, the well core description data of the clastic rock, the well core description data of the clastic rock comprising physical properties of the clastic rock for the reservoir cells adjacent the well bores from which well core samples are obtained, the physical properties of the clastic rock comprising structure and grain size of the clastic rock;

(c) assembling in the memory of the data processing system the received well core description data of the carbonate rock received, and the well core description data of the clastic rock received to generate assembled well core description data for the carbonate rock and the clastic rock comprising the texture, the grain size and the mineral composition of the carbonate rock and the structure and the grain size of the clastic rock;

(d) merging, for each of the wells of interest, the wireline well log data obtained from wireline logs of the wells of interest with the assembled well core description data to generate merged well data for the well, the merging comprising associating the wireline well log data and the texture, the grain size and the mineral composition of the carbonate rock and the structure and the grain size of clastic rock of the assembled well core description data for common depths within the well;

(e) correlating the wireline log data and assembled well core description data of the merged well data at common depths in the wells of interest to generate correlated lithofacies for the wells of interest;

(f) transferring the correlated lithofacies for the wells of interest into the well grid cells according to the locations of the wells in the three-dimensional system of cells of the reservoir model, the correlated lithofacies transferred into each well grid cell comprising physical properties of rock associated with the well grid cell comprising texture, grain size and mineral composition of carbonate rock associated with a location of the grid cell, and structure and grain size of clastic rock associated with the location of the grid cell;

(g) forming, with the processor by uncertainty modeling, predicted measures of lithofacies for the reservoir grid cells where no wells are present, the uncertainty modeling comprising neural network processing by the processor utilizing transferred correlated lithofacies in the well grid cells as a training model for the neural network processing, the predicted measures of lithofacies for each well grid cell where no wells are present comprising physical properties of rock associated with the well grid cell where no wells are present, the physical properties of rock associated with each well grid cell where no wells are present comprising texture, grain size and mineral composition of carbonate rock associated with a location of the grid cell, and structure and grain size of clastic rock associated with the location of the grid cell;

(h) forming with the processor the model of lithofacies of the subsurface reservoir from:
  (1) the correlated lithofacies transferred into the well grid cells according to the locations of the wells in the reservoir; and
  (2) the formed predicted measures of lithofacies for the reservoir grid cells where no wells are present;

(i) storing in the memory of the data processing system the model of lithofacies of the subsurface reservoir; and (j) forming with the graphical user display an image of the model of lithofacies for the subsurface reservoir as a geological model of lithology of the subsurface reservoir for reservoir planning and development.

12. The data storage device of claim 11, wherein the stored instructions further include instructions causing the graphical user display to form an image of the wireline well logs at the depth of interest correlated with the model of lithofacies.

13. The data storage device of claim 11, the steps further comprising:

(d2) forming, based on the merged well data, a lithological model;

(d3) displaying the lithological model for review by a user;

(d4) receiving, responsive to the display of the lithological model, an indication from the user that the lithological model is reasonable, wherein the correlating of the wireline log data and the assembled well core description data of the merged well data is responsive to receiving the indication that the lithological model is reasonable, and wherein the correlating comprises an interactive correlating comprising:

displaying of a derived model of lithofacies for each of the wells of interest and a plot of digital data representing a proposed correlation of lithofacies of the wells of interest;

receiving, from a user, digital manipulation of the digital data representing the proposed correlation of lithofacies of the wells of interest; and generating, based on the digital manipulation of the digital data representing the proposed correlations of lithofacies of the wells of interest, the correlated lithofacies for the wells of interest.

\* \* \* \* \*

UNITED STATES PATENT AND TRADEMARK OFFICE
CERTIFICATE OF CORRECTION

PATENT NO. : 11,093,576 B2
APPLICATION NO. : 13/616493
DATED : August 17, 2021
INVENTOR(S) : Sung et al.

It is certified that error appears in the above-identified patent and that said Letters Patent is hereby corrected as shown below:

In the Claims

In Column 10, Claim 1(c), Line 45 should read:
-- receiving, in the memory under control of the stored --

In Column 12, Claim 6, Line 32 should read:
-- log data are obtained including wells of interest from --

In Column 12, Claim 6, Line 44 should read:
-- samples from the wells of interest in the subsurface --

In Column 13, Claim 6(i)(2), Line 60 should read:
-- the predicted measures of lithofacies for the --

In Column 15, Claim 11(c), Line 22 should read:
-- system the well core description data of the --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*